US010303412B2

(12) United States Patent
Hong et al.

(10) Patent No.: US 10,303,412 B2
(45) Date of Patent: May 28, 2019

(54) MULTI-DISPLAY BASED DEVICE

(71) Applicants: Duk Ki Hong, Gyeonggi-do (KR); Hyuk Kang, Gyeonggi-do (KR); Jeong Hun Kim, Gyeonggi-do (KR); Jae Bong Yoo, Gyeonggi-do (KR); Kyung Soo Lim, Gyeonggi-do (KR); Jun Hak Lim, Gyeonggi-do (KR); Min Gyew Kim, Seoul (KR); Na Jung Seo, Seoul (KR)

(72) Inventors: Duk Ki Hong, Gyeonggi-do (KR); Hyuk Kang, Gyeonggi-do (KR); Jeong Hun Kim, Gyeonggi-do (KR); Jae Bong Yoo, Gyeonggi-do (KR); Kyung Soo Lim, Gyeonggi-do (KR); Jun Hak Lim, Gyeonggi-do (KR); Min Gyew Kim, Seoul (KR); Na Jung Seo, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/013,536

(22) Filed: Feb. 2, 2016

(65) Prior Publication Data

US 2016/0224304 A1  Aug. 4, 2016

(30) Foreign Application Priority Data

Feb. 2, 2015  (KR) .................. 10-2015-0016342

(51) Int. Cl.
*G06T 1/20* (2006.01)
*G06F 3/14* (2006.01)
(Continued)

(52) U.S. Cl.
CPC .............. *G06F 3/1423* (2013.01); *G06T 1/20* (2013.01); *G09G 5/001* (2013.01); *G09G 5/006* (2013.01);
(Continued)

(58) Field of Classification Search
CPC .................. G06F 2221/2105; H04M 1/72563
(Continued)

(56) References Cited

U.S. PATENT DOCUMENTS 8,842,057 B2  9/2014  Sirpal et al.
9,013,416 B2  4/2015  Huang et al.
(Continued)

FOREIGN PATENT DOCUMENTS

CN  201657082  11/2010
CN  203492059  3/2014
(Continued)

OTHER PUBLICATIONS

International Search Report dated May 30, 2016 issued in counterpart appilcation No. PCT/KR2016/001156, 16 pages.
(Continued)

*Primary Examiner* — Thomas J Lett
(74) *Attorney, Agent, or Firm* — The Farrell Law Firm, P.C.

(57) ABSTRACT

An electronic device is provided that includes a first display and a second display. The electronic device also includes a processor configured to allocate a first set of resources to the first display and a second set of resources to the second display. The first set of resources is different from the second set of resources. Each of the first set of resources and the second set of resources includes one or more of at least one available hardware resource and at least one available software resource.

18 Claims, 19 Drawing Sheets

(51) Int. Cl.
*H04M 1/725* (2006.01)
*G09G 5/00* (2006.01)
*H04M 1/02* (2006.01)

(52) U.S. Cl.
CPC .... *H04M 1/72519* (2013.01); *G09G 2356/00* (2013.01); *G09G 2360/04* (2013.01); *H04M 1/0254* (2013.01)

(58) Field of Classification Search
USPC .......................................................... 345/520
See application file for complete search history.

(56) References Cited

U.S. PATENT DOCUMENTS

| | | | |
|---|---|---|---|
| 9,026,178 B2 | 5/2015 | Nil | |
| 9,182,938 B2 | 11/2015 | Zhu et al. | |
| 9,185,643 B2 | 11/2015 | Jouin | |
| 9,304,540 B2* | 4/2016 | Cassar | G06F 1/1616 |
| 2007/0103382 A1* | 5/2007 | Chang | H04B 1/38 345/1.1 |
| 2010/0048190 A1 | 2/2010 | Park et al. | |
| 2010/0064244 A1* | 3/2010 | Kilpatrick, II | G06F 1/1616 715/773 |
| 2011/0159928 A1* | 6/2011 | Nii | H04M 1/0237 455/566 |
| 2011/0185437 A1* | 7/2011 | Tran | H04L 63/104 726/28 |
| 2012/0081272 A1* | 4/2012 | Ogita | G09G 3/20 345/4 |
| 2012/0218191 A1 | 8/2012 | Huang et al. | |
| 2012/0240054 A1* | 9/2012 | Webber | G06Q 10/107 715/752 |
| 2012/0280924 A1* | 11/2012 | Kummer | H04M 1/0235 345/173 |
| 2012/0324540 A1* | 12/2012 | Wu | G06F 1/163 726/4 |
| 2013/0002688 A1 | 1/2013 | Zhu et al. | |
| 2013/0076591 A1 | 3/2013 | Sirpal et al. | |
| 2013/0076595 A1 | 3/2013 | Sirpal et al. | |
| 2013/0076596 A1 | 3/2013 | de Paz et al. | |
| 2013/0076683 A1 | 3/2013 | Reeves | |
| 2013/0082955 A1 | 4/2013 | Becze et al. | |
| 2013/0088442 A1* | 4/2013 | Lee | H04M 1/67 345/173 |
| 2013/0285881 A1 | 10/2013 | Loo et al. | |
| 2015/0087355 A1 | 3/2015 | Jouin | |
| 2015/0178035 A1 | 6/2015 | Loo et al. | |
| 2015/0245166 A1* | 8/2015 | Lee | H04M 1/7253 455/41.2 |
| 2015/0302621 A1* | 10/2015 | Liu | G06T 11/60 345/647 |
| 2016/0054759 A1* | 2/2016 | Lee | G06F 1/1656 361/679.28 |
| 2016/0162106 A1* | 6/2016 | Jeon | G06F 3/0416 345/173 |

FOREIGN PATENT DOCUMENTS

| | | |
|---|---|---|
| EP | 2 530 920 | 12/2012 |
| WO | WO 2008/107732 | 9/2008 |
| WO | WO 2009/030967 | 3/2009 |
| WO | WO 2012/116069 | 8/2012 |

OTHER PUBLICATIONS

European Search Report dated Jul. 4, 2016 issued in counterpart appilcation No. 16153917.6-1972, 8 pages.
Australian Examination Report dated Mar. 16, 2018 issued in counterpart appilcation No. 2016216262, 4 pages.
Australian Examination Report dated Nov. 2, 2017 issued in counterpart appilcation No. 2016216262, 3 pages.
Notice of Acceptance dated Jun. 27, 2018 issued in counterpart appiication No. 2016216262, 3 pages.

* cited by examiner

MULTI-DISPLAY BASED DEVICE

PRIORITY

This application claims priority under 35 U.S.C. § 119(a) to a Korean Patent Application filed in the Korean Intellectual Property Office on Feb. 2, 2015 and assigned serial number 10-2015-0016342, the entire disclosure of which is incorporated herein by reference.

BACKGROUND

1. Field of the Disclosure

The present disclosure relates generally to an electronic device having a display, and more particularly, to an electronic device that includes two or more displays and sets hardware resources or software resources corresponding to the two or more displays to be different from each other, and a method executed on the electronic device.

2. Description of the Related Art

Network devices such as base stations are installed throughout the country. The network devices receive data from and transmit data to other electronic devices through a network. Thus, a user is able to freely utilize the network anywhere in the country.

Various kinds of electronic devices provide a variety of functions in accordance with the recent trend of the digital convergence. For example, a smartphone supports a call function as well as an Internet connection through the network. Furthermore, the smartphone supports a function for reproducing music or videos, a function for capturing videos or photos using an image sensor, and the like.

Generally, an electronic device provides a user with a variety of information through a single display. However, an electronic device that is equipped with a plurality of displays is also required to provide the above-described functions.

SUMMARY

An aspect of the present disclosure provides an electronic device that operates different applications on displays, on which the different applications are executed, from among a plurality of displays of the electronic device, and a method thereof.

In accordance with an aspect of the present disclosure, an electronic device is provided that includes a first display and a second display. The electronic device also includes a processor configured to allocate a first set of resources to the first display and a second set of resources to the second display. The first set of resources is different from the second set of resources. Each of the first set of resources and the second set of resources includes one or more of at least one available hardware resource and at least one available software resource.

In accordance with another aspect of the present disclosure, a method performed on an electronic device is provided. A first set of resources is allocated to the first display. A second set of resources is allocated to the second display. The second set of resources is different from the first set of resources. Each of the first set of resources and the second set of resources comprises one or more of at least one available hardware resource and at least one available software resource In accordance with another aspect of the present disclosure, an electronic device is provided that includes a first display and a second display. The electronic device also includes a memory storing information indicating a first set of resources allocated to the first display and a second set of resources allocated to the second display. The first set of resources is different from the second set of resources. The electronic device further includes a processor configured to execute an application of the first display in accordance with the first set of resources, and transition the application to execute on the second display in accordance with the second set of resources.

BRIEF DESCRIPTION OF THE DRAWINGS

The above and other aspects, features, and advantages of embodiments of the present disclosure will be more apparent from the following detailed description when taken in conjunction with the accompanying drawings, in which.

DETAILED DESCRIPTION

Figure 1:
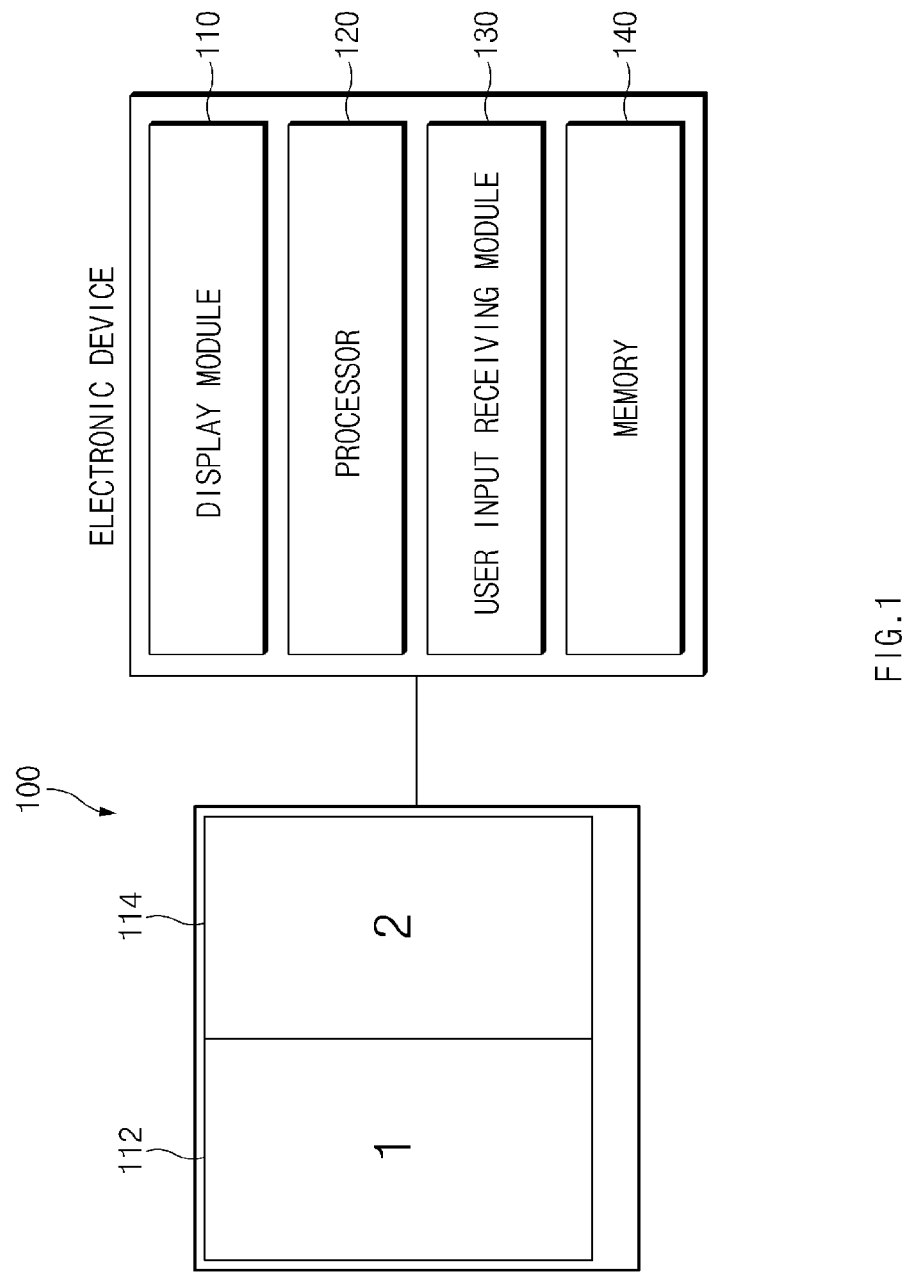
FIG. 1 is a block diagram illustrating an electronic device equipped with a plurality of displays, according to an embodiment of the present disclosure.

Embodiments of the present disclosure are described in detail with reference to accompanying drawings. The same or similar components may be designated by the same or similar reference numerals although they are illustrated in different drawings. Detailed descriptions of constructions or processes known in the art may be omitted to avoid obscuring the subject matter of the present disclosure.

As described herein, the expressions "have", "may have", "include", "comprise", "may include", and "may comprise" indicate the existence of corresponding features (e.g., elements such as numeric values, functions, operations, or components) but do not exclude presence of additional features.

As described herein; the expressions "A or B", "at least one of A and B", "one or more of A and B", and the like may include any and all combinations of one or more of the associated listed items. For example, the term "A or B", "at least one of A and B", or "one or more of A and B" may refer to the case where at least one A is included, the case where at least one B is included, or the case where both of at least one A and at least one B are included.

Terms, such as "first", "second", and the like, as used herein, may refer to various elements of various embodiments of the present disclosure, but do not limit the elements. For example, such terms do not limit the order and/or priority of the elements. Furthermore, such terms may be used to distinguish one element from another element. For example, without departing the scope of the present disclosure, a first element may be referred to as a second element, and similarly, a second element may be referred to as a first element.

When an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to", as used herein, may be used interchangeably with, for example, the expression "suitable for", "having the capacity to", "designed to", "adapted to", "made to", or "capable of". The term "configured to" does not only mean "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation, or a generic-purpose processor (e.g., a central processing unit (CPU) or an application processor) that may perform corresponding operations by executing one or more software programs stored in a memory device.

Terms used herein are used to describe specified embodiments of the present disclosure and are not intended to limit the scope of the present disclosure. The terms of a singular form may also include plural forms unless otherwise specified. Unless otherwise defined herein, all terms used herein, which include technical or scientific terms, may have the same meanings that are generally understood by a person skilled in the art. It will be further understood that terms, which are defined in a dictionary and are commonly used, should also be interpreted as is customary in the relevant related art, and not in an idealized or overly formal detect unless expressly so defined herein in embodiments of the present disclosure. In some cases, even if terms are defined in the specification, they may not be interpreted to exclude embodiments of the present disclosure.

An electronic device, according to embodiments of the present disclosure, may be embodied as at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, a wearable device (e.g., head-mounted-device (HMD), such as electronic glasses), electronic apparel, an electronic bracelet, an electronic necklace, an electronic appcessory, an electronic tattoo, a smart mirror, a smart band, a smart watch, and the like.

According to embodiments of the present disclosure, the electronic device may be embodied as a smart home appliance. The smart home appliance may include at least one of, for example, a television (TV), a digital versatile disc (DVD) player, an audio player, a refrigerator, an air conditioner, a cleaner, an oven, a microwave oven, a washing machine, an air cleaner, a set-top box, a TV box, a game console, an electronic dictionary, an electronic key, a camcorder, an electronic picture frame, and the like.

According to embodiments of the present disclosure, the electronic device may be embodied as at least one of a medical device (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices) receiving a user input in an idle mode, a navigation device, a global positioning system (GPS) receiver, an event data recorder (EDR), a flight data recorder (FDR), a vehicle infotainment device, electronic equipment for vessels (e.g., navigation systems and gyrocompasses), avionics, a security device, a head unit for vehicles, an industrial or home robot, an automated teller machine (ATM), a point of sales (POS) device, or an Internet of Things (IoT) device (e.g., light bulbs, various sensors, electric or gas meters, sprinkler devices, fire alarms, thermostats, street lamps, toasters, exercise equipment, hot water tanks, heaters, boilers, and the like).

According to embodiments of the present disclosure, the electronic device may be embodied as at least one of a part of furniture or buildings/structures, an electronic board, an electronic signature receiving device, a projector, or various measuring instruments (e.g., a water meter, an electricity meter, a gas meter, or a wave meter, and the like). According to embodiments of the present disclosure, the electronic device may be embodied as one of the above-described devices or a combination thereof. An electronic device, according to an embodiment of the present disclosure, may be a flexible electronic device. Also, an electronic device, according to embodiment of the present disclosure, is not limited to the above-described devices, and may include new electronic devices according to technology development.

Hereinafter, electronic devices, according to embodiments of the present disclosure, are described with reference to the accompanying drawings. The term "user", as used herein, may refer to a person who uses an electronic device or may refer to a device (e.g., an artificial electronic device) that uses an electronic device.

FIG. 1 is a block diagram illustrating an electronic device equipped with a plurality of displays, according to an embodiment of the present disclosure. Referring to FIG. 1, an electronic device 100 includes two or more displays (e.g., a first display 112 and a second display 114).

Each of the first display 112 and the second display 114 may be embodied as, for example, a liquid crystal display (LCD), a light-emitting diode (LED) display, an organic LED (OLED) display, a microelectromechanical systems (MEMS) display, or an electronic paper display.

Each of the first display 112 and the second display 114 may display, for example, various contents (e.g., text, an image, a video, an icon, a symbol, and the like) through a display module 110.

However, the shape, the position, the size, and the type of each of the first display 112 and the second display 114 are not limited to those illustrated in FIG. 1. For example, a shape of each of the first display 112 and the second display 114 may not be rectangular, or the sizes of the first display 112 and the second display 114 may be different from each other. Furthermore, the first display 112 may be disposed at the front of the electronic device 100, and the second display 114 may be disposed at the rear of the electronic device 100.

According to embodiments of the present disclosure, the first and second displays 112 and 114 may correspond to independent display panels. Alternatively, the first and second displays 112 and 114 may correspond to different areas defined on a single display panel.

The electronic device 100 includes the display module 110, a processor 120, a user input receiving module 130, and a memory 140. However, the electronic device 100, as illustrated in FIG. 1, is only one of various embodiments of the present disclosure and may be changed or modified based on components illustrated in FIG. 1. For example, the electronic device 100 may further include input devices, such as, for example, a keyboard for receiving instructions or information from a user, a mouse, and the like. Furthermore, the electronic device 100 may further include an antenna, a radio frequency IC (RFIC), and a communication module for communication with an external device.

According to embodiments of the present disclosure, application execution screens and the like may be displayed on the first display 112 and the second display 114 under control of the display module 110. The application execution screen may include the various pieces of content, as described above. Furthermore, the application execution screen may refer to a background screen including application icons, widget screens, and the like.

According to embodiments of the present disclosure, the processor 120 may perform data processing or an operation associated with control and/or communication of at least one or more other components (e.g., the display module 110, the user input receiving module 130, the memory 140, and the like).

The processor 120 may be implemented with, for example, a system on chip (SoC) and may include one or more of a CPU, a graphic processing unit (GPU), an image signal processor, an application processor (AP), or a communication processor (CP).

The processor 120 may load and process an instruction or data, which is received from at least one other component, and may store a variety of data in the memory 140.

The processor 120 may apply available resources (e.g., hardware resources, software resources, or the like) to the first display 112 and the second display 114. In this case, the processor 120 may assign resources, which are available in common with respect to the first display 112 and the second display 114, to the first display 112 and the second display 114 as needed.

However, according to embodiments of the present disclosure, a resource (hereinafter a "first resource") corresponding to the first display 112 and a resource (hereinafter a "second resource") corresponding to the second display 114 may have independently predetermined magnitudes (e.g., a first resource magnitude and a second resource magnitude). If a hardware resource or a software resource is used with respect to the first display 112, a resource may be assigned within a first resource magnitude range as needed. If a hardware resource or a software resource is used with respect to the second display 114, a resource may be assigned within a second resource magnitude range as needed. For example, if the electronic device 101 has a RAM with a capacity of 8 MB, the processor 120 can assign up to 50% the RAM to the first display 112 and can assign up to 25% of the RAM to the second display 114. In this case, if the hardware (i.e., RAM) resource is used with respect to the first display 112, the capacity of the RAM may be assigned within 4 MB (i.e., the first resource magnitude range) as needed.

For example, a resource may be assigned according to a request of an application executed by the processor 120. However, whether an application executed by the processor 120 is displayed on the first display 112 or the second display 114 may be determined in advance.

In an example in which the hardware resources are applied differently to the first display 112 and the second display 114, the processor 120 may determine that hardware components accessible with respect to the first display 112 and hardware components accessible with respect to the second display 114 are different from each other. The hardware components may include, for example, a speaker, a microphone, a receiver, a sensor, a communication module, and the like.

In an example in which the software resources are applied different to the first display 112 and the second display 114, the processor 120 may determine that a user account corresponding to the first display 112 and a user account corresponding to the second display 114 are different from each other. Furthermore, the processor 120 may determine a security level corresponding to the first display 112 and a security level corresponding to the second display 114 to be different from each other.

According to embodiments of the present disclosure, the user input receiving module 130 may receive a user input, which allows an application execution screen displayed on the first display 112 to be displayed on the second display 114. Alternatively, the user input receiving module 130 may receive a user input, which allows an application execution screen, displayed on the second display 114 to be displayed on the first display 112. The user input may be received through a menu user interface (UI) or may be received through an operation of swiping a user's finger(s) on the first display 112 in a direction of the second display 114, or on the second display 114 in a direction of the first display 112.

The user input may include a touch input on the first display 112 or the second display 114 using a finger or stylus (e.g., an S-pen or the like). The touch input may mean that the finger or stylus makes physical contact with a screen of the electronic device 100.

However, the user input may also be implemented when a finger or stylus does not make contact with a screen (e.g., a hovering state). For example, when a finger is within a specified distance of the first display 112 or the second display 114, the electronic device 100 may detect a variation in an electromagnetic field caused by the finger. The user input receiving module 130 may determine whether the user input occurs, based on the detected variation. Similarly, when the stylus is close to the first display 112 or the second display 114, the user input receiving module 130 may determine that the touch input occurs.

According to embodiments of the present disclosure, the processor 120 may allow an application execution screen, displayed on the first display 112, to be displayed on the second display 114 through the display module 110, based on the user input received by the user input receiving module 130. Furthermore, the processor 120 may reset the application execution screen displayed on the second display 114 so as to use a hardware resource or software resource available with respect to the second display 114.

According to embodiments of the present disclosure, the memory 140 may store data. The data stored in the memory 140 may include data exchanged between internal components of the electronic device 100, and data exchanged between the electronic device 100 and components outside the electronic device 100. For example, the memory 140 may store a list of resources available with respect to the first display 112 and the second display 114.

The memory 140 may include an embedded (or internal) memory or an external memory. For example, the embedded memory may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard disk drive (HDD), or a solid state drive (SSD).

The external memory may include a flash drive, such as, for example, compact flash (CF), secure digital (SD), micro secure digital (Micro-SD), mini secure digital (Mini-SD), extreme digital (xD), multimedia card (MMC), or memory stick. The external memory may be functionally and/or physically connected to the electronic device 100 through various interfaces.

The display module 110, the processor 120, the user input receiving module 130, and the memory 140 may be implemented independently of each other, or two or more of the components may be integrated.

Figure 2A:
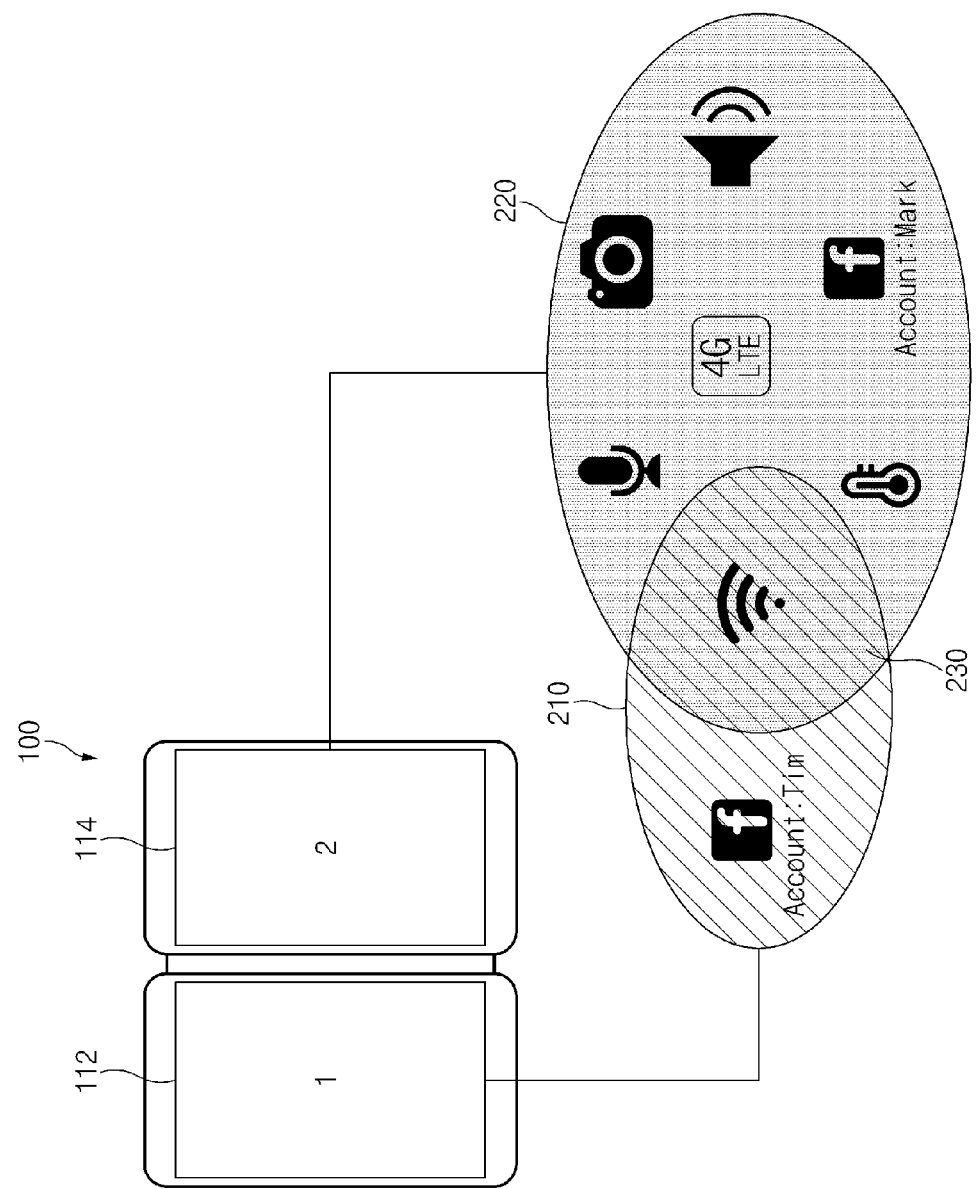
FIGS. 2A and 2B are diagrams illustrating hardware resources and software resources available with respect to respective displays of an electronic device, according to an embodiment of the present disclosure.
Figure 2B:
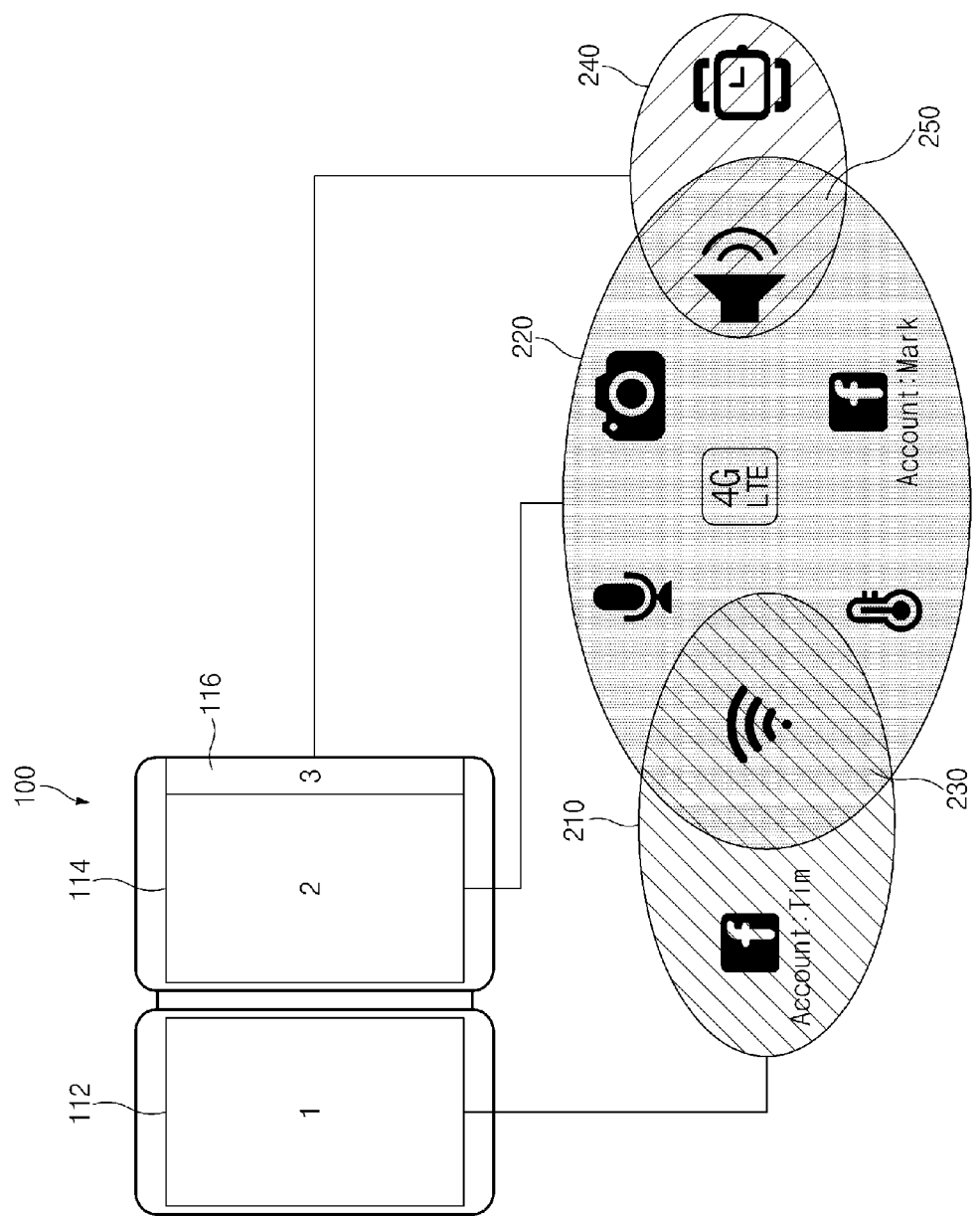

FIGS. 2A and 2B are diagrams illustrating hardware resources and software resources available with respect to displays of an electronic device 100, according to an embodiment of the present disclosure.

In FIG. 2A, a hardware resource and a software resource (hereinafter a first resource 210) are available with respect to the first display 112 and a hardware resource and a software resource (hereinafter a second resource 220) are available with respect to the second display 114.

Referring to FIG. 2A, for example, in the hardware resource, the first resource 210 includes a Wi-Fi communication module for using a Wi-Fi network, and the second resource 220 includes a Wi-Fi communication module for using a Wi-Fi network, a cellular communication module for using a 4G LTE network, a microphone, a camera, a speaker, and a temperature sensor. The Wi-Fi communication module is in a common area 230 of the first resource 210 and the second resource 220. Thus, the Wi-Fi communication module may be available with respect to both the first display 112 and the second display 114.

According to embodiments of the present disclosure, the electronic device 100 may further include one or more of a Bluetooth communication module, a near field communication (NFC) communication module, a global positioning system (GPS) communication module, a cellular communication module for using a 3G network, a gesture sensor, a gyro sensor, a barometric pressure sensor, a magnetic sensor, an acceleration sensor, a grip sensor, a proximity sensor, a color sensor (e.g., red, green, blue (RGB) sensor), a biometric sensor, a humidity sensor, an illuminance sensor, a ultra violet (UV) sensor, an E-nose sensor, an electromyography (EMG) sensor, an electroencephalogram (EEG) sensor, an electrocardiogram (ECG) sensor, an infrared (IR) sensor, an iris sensor, fingerprint sensor, and the like, as hardware resources. Under control of the processor 120, at least one of the components in the first resource 210 or the second resource 220 may be available.

In the software resource, the first resource 210 may include a user account of "Tim", and the second resource 220 may include a user account of "Mark". The processor 120 may allow all applications or each application to have different user accounts corresponding to the first display 112 and the second display 114, respectively.

For example, a user may utilize the first display 112 for personal purposes and the second display 114 for business purposes. Additionally, the user may use the first display 112 for personal purposes and the second display 114 for children's purposes. When children are permitted to use the electronic device 100, there may be a need to restrict the resource, because information to be provided to the children needs be restricted.

In order to determine different user accounts, the processor 120 may select a subscriber identification module (SIM) card corresponding to the first display 112 and a different SIM card corresponding to the second display 114. The SIM card may include, for example, unique identify information (e.g., integrated circuit card identifier (ICCID)) or subscriber information (e.g., integrated mobile subscriber identity (IMSI)).

Although not illustrated in FIG. 2A, according to embodiments of the present disclosure, the processor 120 may determine a security level corresponding to the first display 112 and a different security level corresponding to the second display 114.

In FIG. 2B, the first resource 210, which is available with respect to the first display 112, the second resource, which is available with respect to the second display 114, and a hardware resource and a software resource (hereinafter referred to as a third resource 240), which are available with respect to a third display 116, are shown.

Referring to FIG. 2B, for example, in the hardware resource, the first resource 210 includes a Wi-Fi communication module for using a Wi-Fi network, and the second resource 220 includes a Wi-Fi communication module for using a Wi-Fi network, a cellular communication module for using a 4G LTE network, a microphone, a camera, a speaker, and a temperature sensor. In addition, the third resource 240 includes a speaker and a notification module. The Wi-Fi communication module is in the common area 230 between the first resource 210 and the second resource 220, and thus, the Wi-Fi communication module is available with respect to both the first display 112 and the second display 114. Furthermore, the speaker is in a common area 250 between the second resource 220 and the third resource 240, and thus, the speaker is available with respect to both the second display 114 and the third display 116.

In the software resource, the first resource 210 includes a user account of "Tim", and the second resource 220 includes a user account of "Mark".

FIG. 2A illustrates an embodiment in which the number of displays is 2, and FIG. 2B illustrates an embodiment in which the number of displays is 3. Even when the electronic device 100 is equipped with four or more displays, hardware resources and software resources may be differently applied thereto, as described above with reference to FIGS. 2A and 2B.

Figure 3:
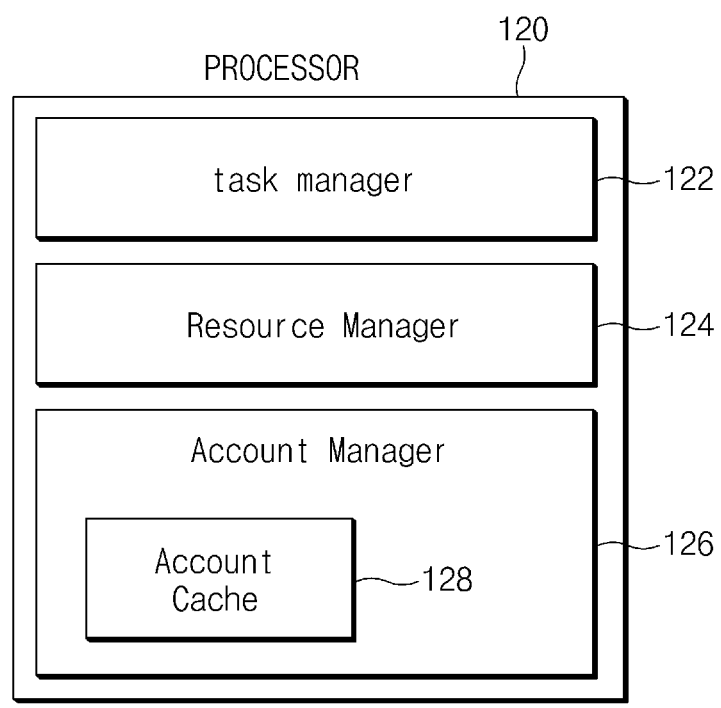
FIG. 3 is a block diagram illustrating a processor of an electronic device, according to an embodiment of the present disclosure.

FIG. 3 is a block diagram of a processor of an electronic device according to an embodiment of the present disclosure. The processor 120 includes a task manager 122, a resource manager 124, and an account manager 126.

According to embodiments of the present disclosure, the task manager 122 may assign an access right about at least one hardware component to an application executed on the first display 112 or the second display 114. As described above, the hardware components may include a camera, a speaker, a microphone, a receiver, a sensor, and a communication module.

According to embodiments of the present disclosure, the resource manager 124 may receive an access request about at least one of the hardware components from the executed application. Furthermore, the resource manager 124 may transfer the received access request to the task manager 122. The assigning of the access right at the task manager 122 may include receiving the access request and assigning the access right based on a result of determining whether a display where the application is being executed is the first display 122 or the second display 114.

According to embodiments of the present disclosure, the task manager 122 may include a plurality of task managers of which the number is the same as the number of displays. For example, the task manager 122 may include a first task manager corresponding to the first display 112, and a second task manager corresponding to the second display 114. A subject that determines whether a display where the application runs is the first display 112 or the second display 114 may be the resource manager 124. The resource manager 124 may transfer the received access request to the first task manager or the second task manager based on the determination result.

According to embodiments of the present disclosure, the account manager 126 may determine whether an application is executed on the first display 112 or the second display 114 and may enable a corresponding account based on the determination result. The account manager 126 includes an account cache 128 that stores account information. The account cache 128 includes a plurality of account caches of which the number is the same as the number of displays included in the electronic device 100. The plurality of account caches may respectively store pieces of account information that are determined differently for each display.

Figure 4A:
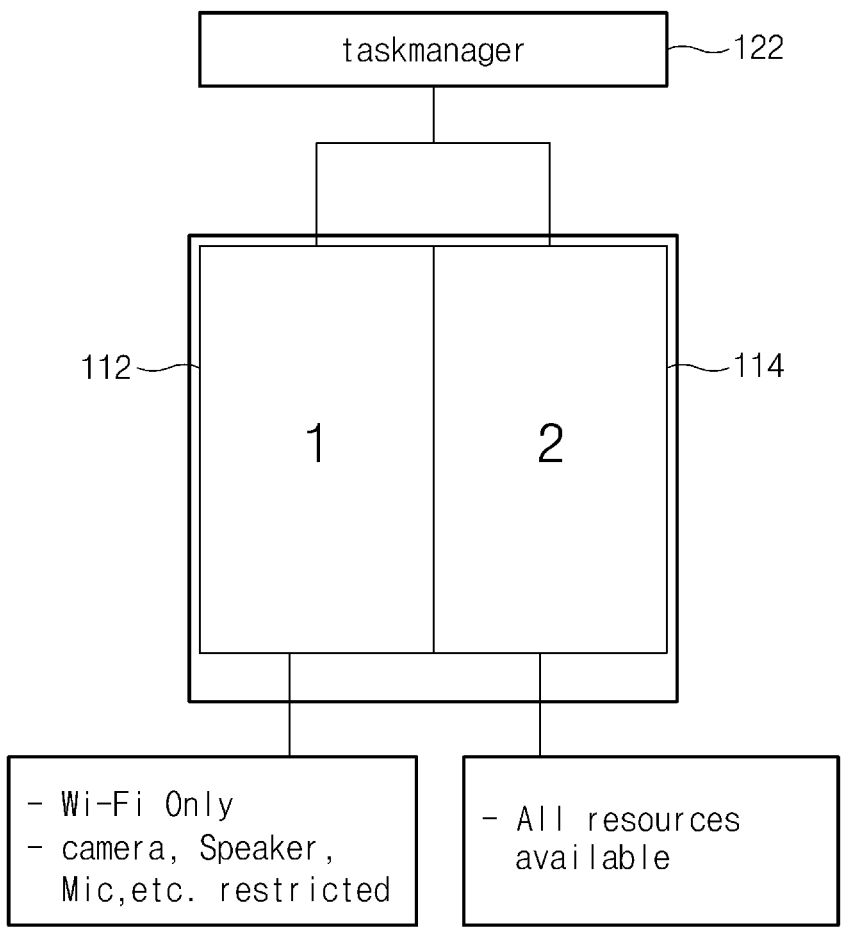
FIGS. 4A and 4B are diagrams illustrating a difference according to the number of task managers of a processor, according to an embodiment of the present disclosure.
Figure 4B:
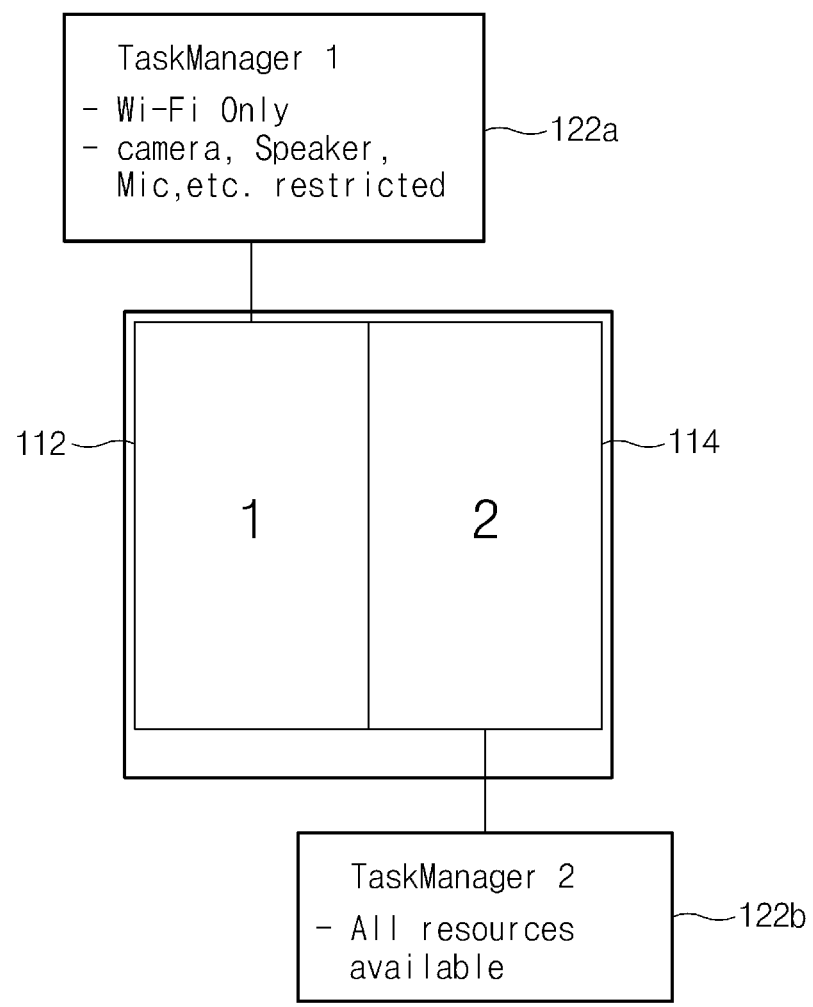

FIGS. 4A and 4B are diagrams illustrating a difference that exists according to the number of task managers of a processor, according to an embodiment of the present disclosure. In FIG. 4A, the processor 120 includes one task manager 122. In FIG. 4B, the task manager 122 includes a first task manager 122a and a second task manager 122b.

Referring to FIG. 4A, the task manager 122 may assign a right about a hardware resource to each of the first display 122 and the second display 114.

Referring to FIG. 4B, the task manager 122a may assign a right about a hardware resource to the first display 122, and the task manager 122b may assign a right about a hardware resource to the second display 122.

According to embodiments of the present disclosure, hardware components available with respect to the first display 112 may include only a Wi-Fi communication module, and a camera, a speaker, a microphone, and the like may be restricted with respect to the first display 112. In contrast, all hardware components included in the electronic device 100 may be available with respect to the second display 112.

An application, which is executed on the first display 112, requests an access right for a microphone or a camera from the resource manager 124 in FIGS. 4A and 4B.

Referring to FIG. 4A, the task manager 122 may receive an access right from the resource manager 124, may determine whether a display corresponding to the application is the first display 112 or the second display 114, and may refuse the access right based on a result of the determination.

In contrast, referring to FIG. 4B, the resource manager 124 may determine whether a display corresponding to the application is the first display 112 or the second display 114, based on the requested access right, and may transfer the access right to the first task manager 122a based on a result of the determination. The first task manager 122a may refuse the access right based on whether the application corresponding to the first display 112 has an access right for the microphone or the camera.

Operations performed with respect to FIGS. 4A and 4B are described in greater detail below with reference to FIGS. 5 and 6.

Figure 5:
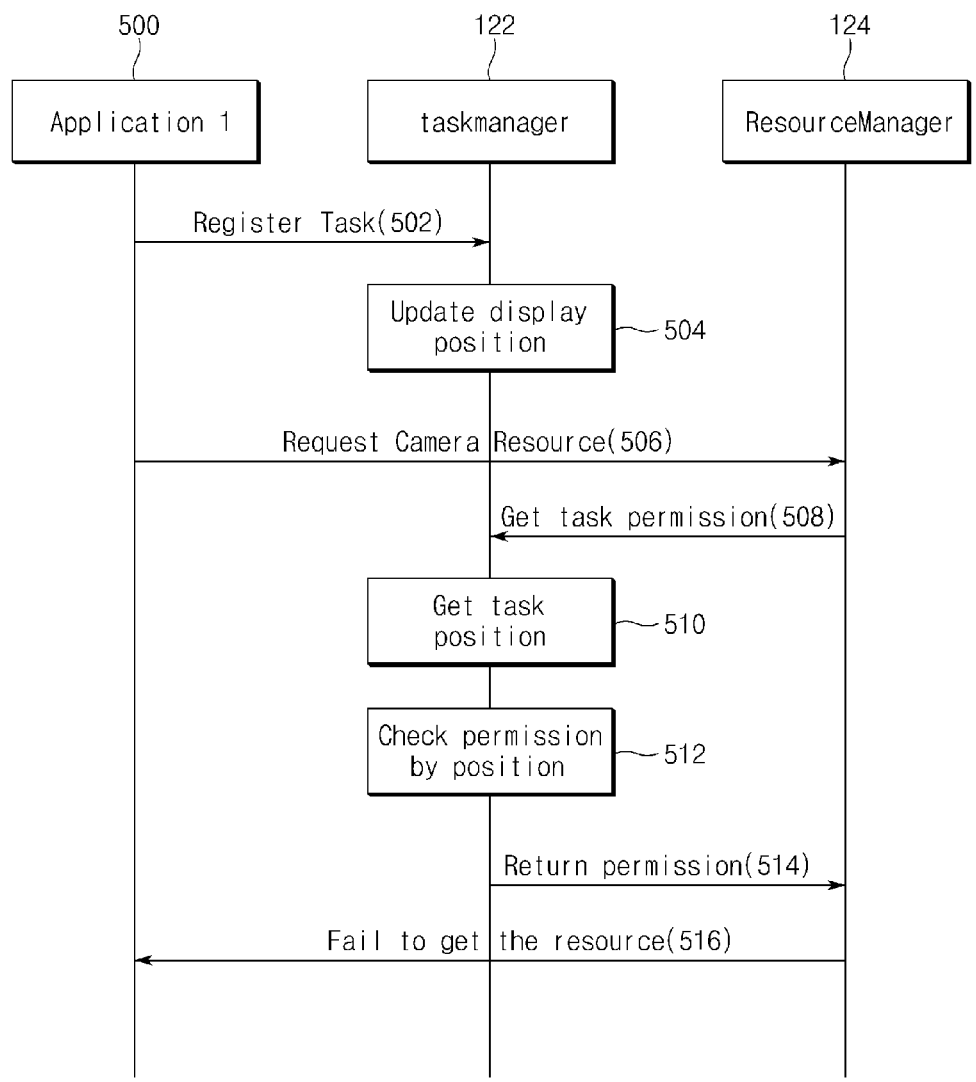
FIG. 5 is a flow chart illustrating a method in which an electronic device assigns a right for a hardware component to an application when a processor includes one task manager, according to an embodiment of the present disclosure.

FIG. 5 is a flow chart illustrating a method in which an electronic device assigns a right about a hardware component to an application when a processor includes a single task manager, according to an embodiment of the present disclosure. With respect to the method of FIG. 5, operations are included that the electronic device 100, according to FIGS. 4A and 4B, processes time-sequentially. The electronic device 100, as described with respect to FIGS. 1 to 4, may be applied to the assigning method illustrated in FIG. 5. An application 500 is executed on the first display 112, which is set such that access to a camera resource is restricted.

In step 502, the application 500 sends a request to the task manager 122 to register a task, according to an execution of the application 500.

In step 504, the task manager 122 registers a task for the application 500 based on the received request. The task manager 122 may register a display position (e.g., a position of the first display 112) for the application 500 together with the task.

In step 506, the application 500 sends a request for a right for a camera resource to the resource manager 124.

In step 508, the resource manager 124 transfers the received right request to the task manager 122.

In step 510, the task manager 122 searches for a display position for the application 500 based on the received right request.

In step 512, the task manager 122 determines whether the camera resource is restricted with regard to the first display 112, based on the display position found in operation 510.

In step 514, the task manager 122 transmits a result of the determination of step 512 to the resource manager 124.

In step 516, the resource manager 124 notifies the application 500 that access to the camera resource is not possible, based on the result received in step 514.

Figure 6:
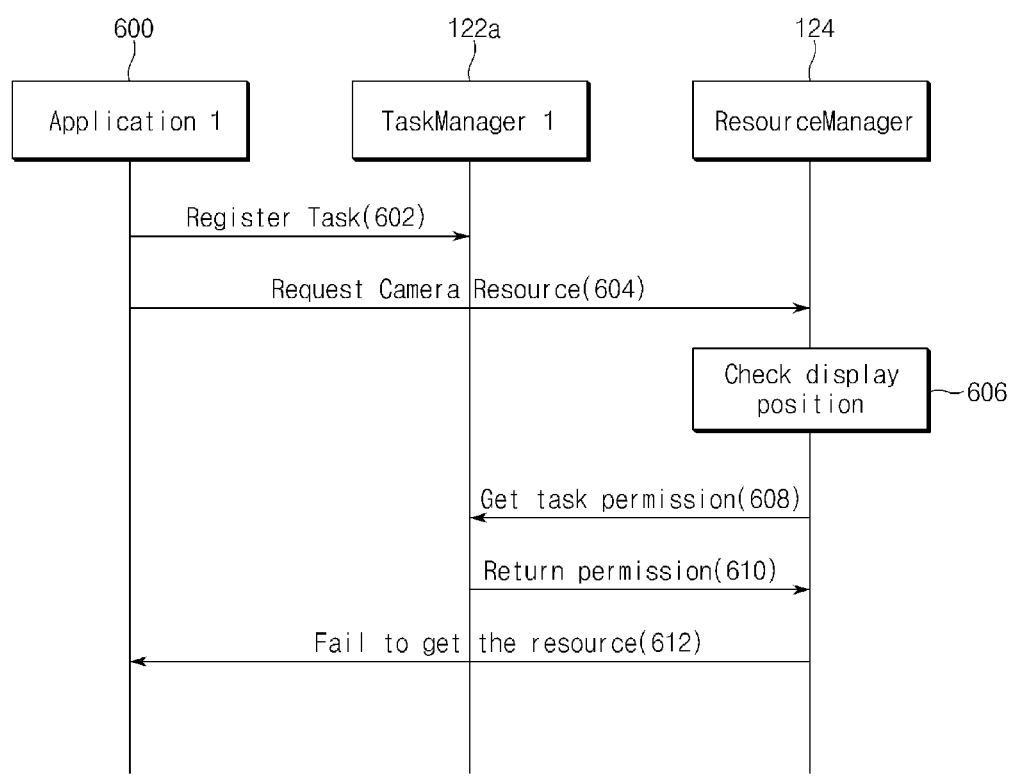
FIG. 6 is a flow chart illustrating a method in which an electronic device assigns a right for a hardware component to an application when a processor includes a plurality of task managers, according to an embodiment of the present disclosure.

FIG. 6 is a flow chart illustrating a method in which an electronic device assigns a right for a hardware component to an application when a processor includes a plurality of task managers, according to an embodiment of the present disclosure. With respect to the method of FIG. 6, operations are included that the electronic device 100, according to FIGS. 4A and 4B, processes time-sequentially. The electronic device 100, as described with reference to FIGS. 1 to 4, may be applied to the assigning method illustrated in FIG. 6. As described with reference to FIG. 5, an application 600 is executed on the first display 112, which is set such that an access to a camera resource is restricted.

In step 602, the application 600 sends a request to the task manager 122a to register a task, according to an execution of the application 600. If the application 600 is executed on the second display 114, the application 600 may send a request to the task manager 122b to register the task. Unlike the method described with reference to FIG. 5, the task manager 122a does not separately store a display position corresponding to the application 600.

In step 604, the application 600 sends a request for a right for a camera resource to the resource manager 124.

In step 606, the resource manager 124 determines a display position for the application 600 based on the received right request. The display position corresponding to the application 600 may be included in a signal packet of the right request.

In step 608, the resource manager 124 transfers the received right request to the task manager 122a corresponding to the first display 112, based on a result of the determination in step 606.

In step 610, the task manager 122a determines whether the camera resource is a resource that is restricted with regard to the first display 112. In addition, the task manager 122a transmits a result of the determination to the resource manager 124.

In step 612, the resource manager 124 notifies the application 600 that access to the camera resource is not possible, based on the result received in step 610.

Figure 7:
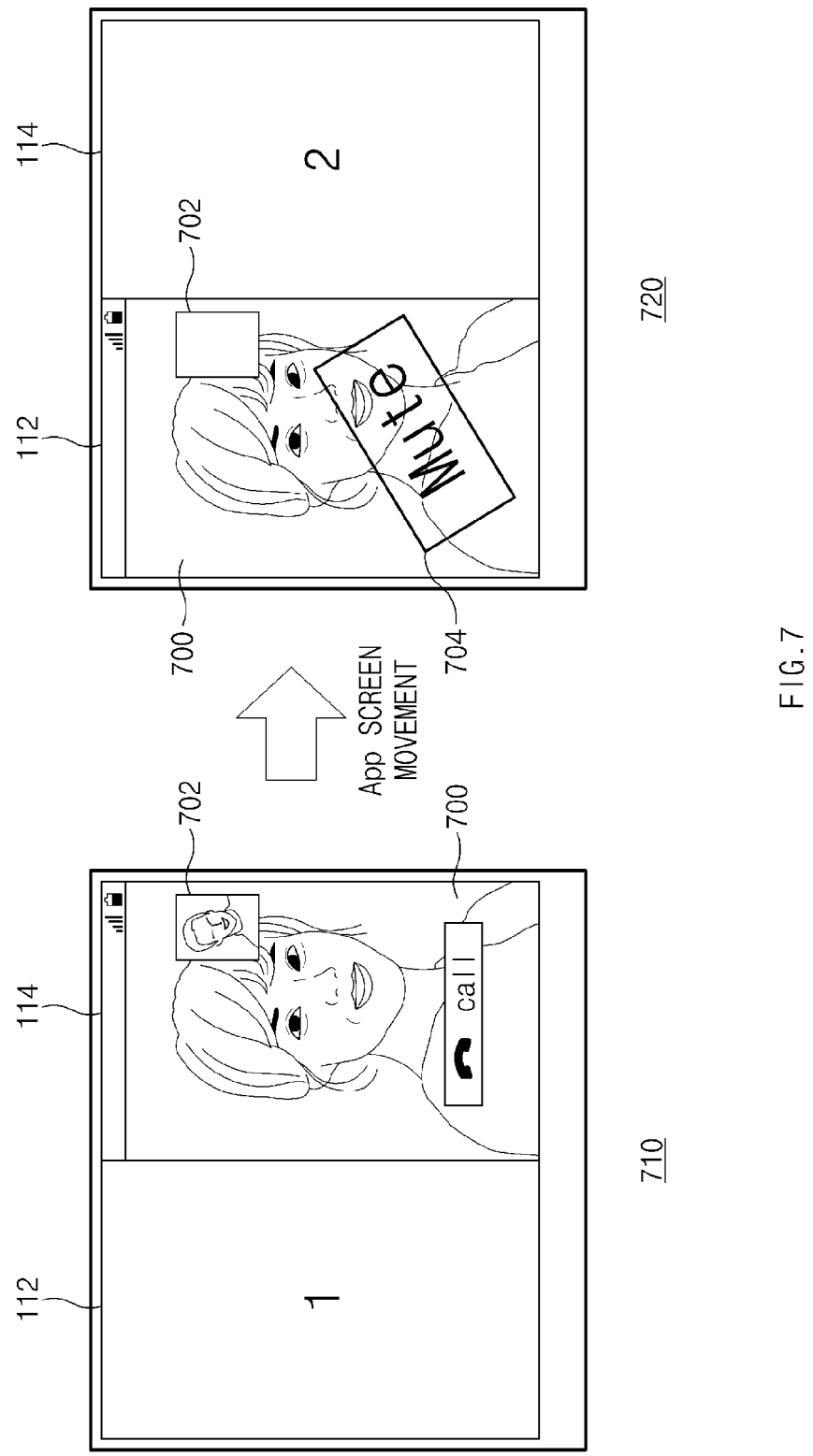
FIG. 7 is a diagram illustrating an operation in which a display on which an application is executed is changed through a user input and a hardware resource being used is changed, according to an embodiment of the present disclosure.

FIG. 7 is a diagram illustrating an operation in which a display on which an application is executed is changed through a user input and a hardware resource being used is changed, according to an embodiment of the present disclosure. Hardware resources available on each of the first display 112 and the second display 114 are described with reference to hardware components illustrated in FIGS. 4A and 4B.

Referring to FIG. 7, a first operational state 710 transitions to a second operational state 720 based on a user input for an execution screen of an application 700 displayed on the second display 114. When the first operational state 710 is changed into the second operational state 720, the execution screen of the application 700 displayed on the second display 114 is moved to and displayed on the first display 112. The user input may refer to an operation (e.g., a swipe operation) of flicking a user input tool, such as a finger or a stylus, on the second display 114 in a direction of the first display 112.

A video call application 700 is executed on the first operational state 710 and the second operational state 720. Referring to the first operational state 710, an application being executed on the second display 114 may be able to use all hardware resources, and thus, the video call application 700 may use all desired hardware components, such as, for example, a microphone, a camera, a receiver, and the like. For example, an image of a user of the electronic device 100 may be displayed on an area 702 through a camera. Furthermore, the user may transfer the user's voice to the opposite party through a microphone and may hear a voice of the opposite party through a receiver.

In contrast, since an application being executed on the first display 112 is only able to use a Wi-Fi communication module, the video call application 700 cannot use hardware components, such as, for example, a microphone, a camera, a receiver, and the like. Referring to the second operational state 720, therefore, an image of the user of the electronic device 100 may not be displayed on the area 702, and a mute icon may be displayed on an area 704. The application 700 may end if the video call is made using a cellular communication module, and not the Wi-Fi communication module.

In order to perform another task while making the video call, or receive a call through a cellular network, the user may set the video call to a call waiting state.

Figure 8:
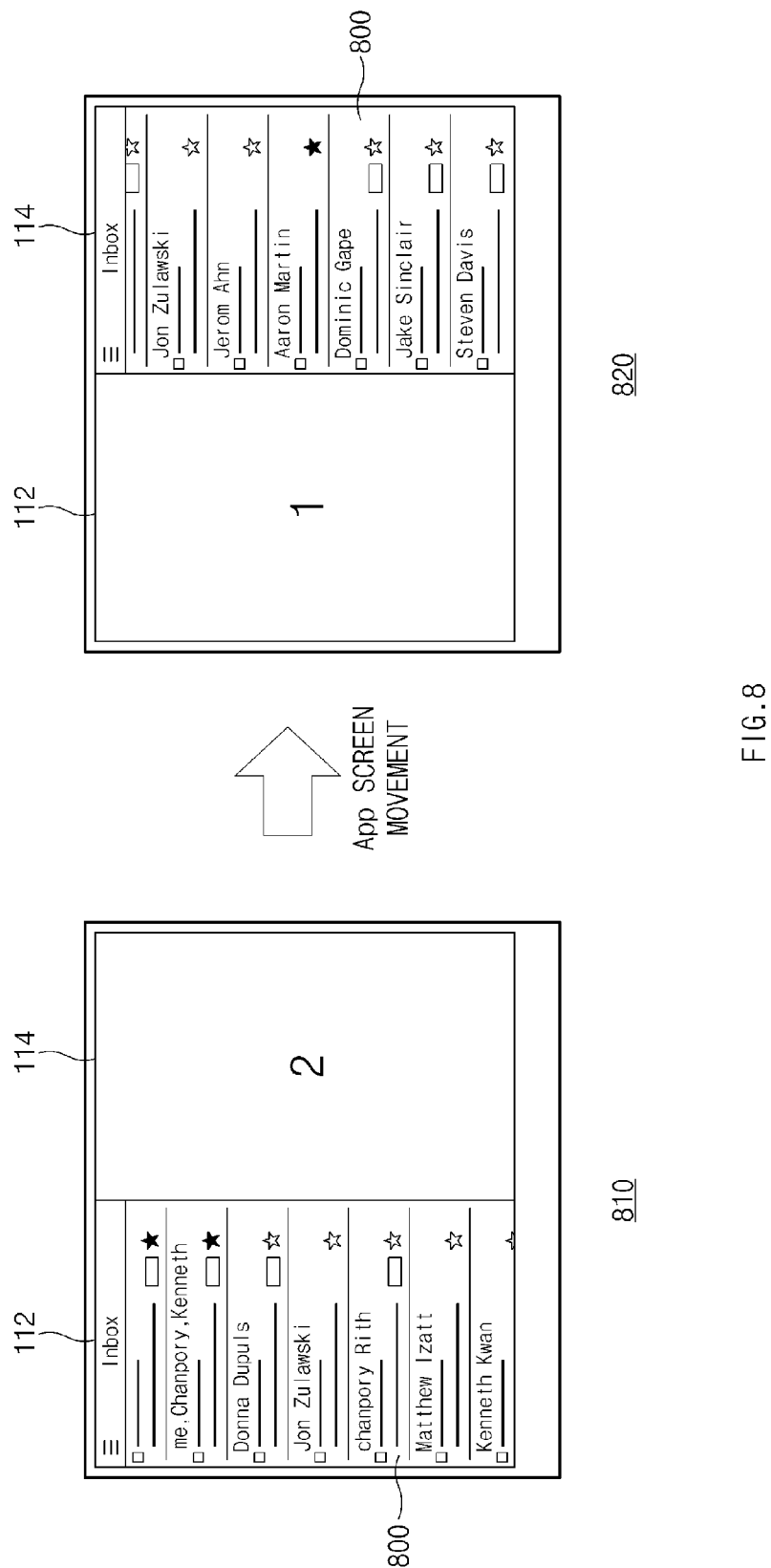
FIG. 8 is a diagram illustrating an operation in which a display on which an application is executed is changed through a user input and a software resource being used is changed, according to an embodiment of the present disclosure.

FIG. 8 is a diagram illustrating an operation in which a software resource where an application is executed is changed through a user input, according to an embodiment of the present disclosure. User accounts corresponding to the first and second displays 112 and 114, described with reference to FIG. 2, are exemplified as the software resource.

In FIG. 8, an application 800 that is displayed on the first display 112 in a first operational state 810 is moved to the second display 114 in a second operational state 820 through the user input. As with FIG. 7, the user input may mean an operation (e.g., a swipe operation) of flicking a user input tool, such as a finger or a stylus, on the first display 112 in a direction of the second display 114.

The application 800 of FIG. 8 is an e-mail application 800. In the first operational state 810, the e-mail application 800 executed on the first display 112 refers to a user account of "Mark", and a list of e-mails sent to "Mark" are displayed on the first display 112. In the second operational state 820, the e-mail application 800 executed on the second display 114 refers to a user account of "Tim", and a list of e-mails sent to "Tim" are displayed on the second display 114.

Thus, the user may use an application with various accounts through a plurality of displays. The processor 120 may determine software resources including the user account to be different for each display, thereby allowing the user to independently utilize one display for personal purposes and another display for business purposes with one electronic device. Furthermore, the processor 120 may set security levels differently for each display, thereby making it possible to independently utilize one display for personal purposes and another display for children with a single electronic device.

Figure 9:
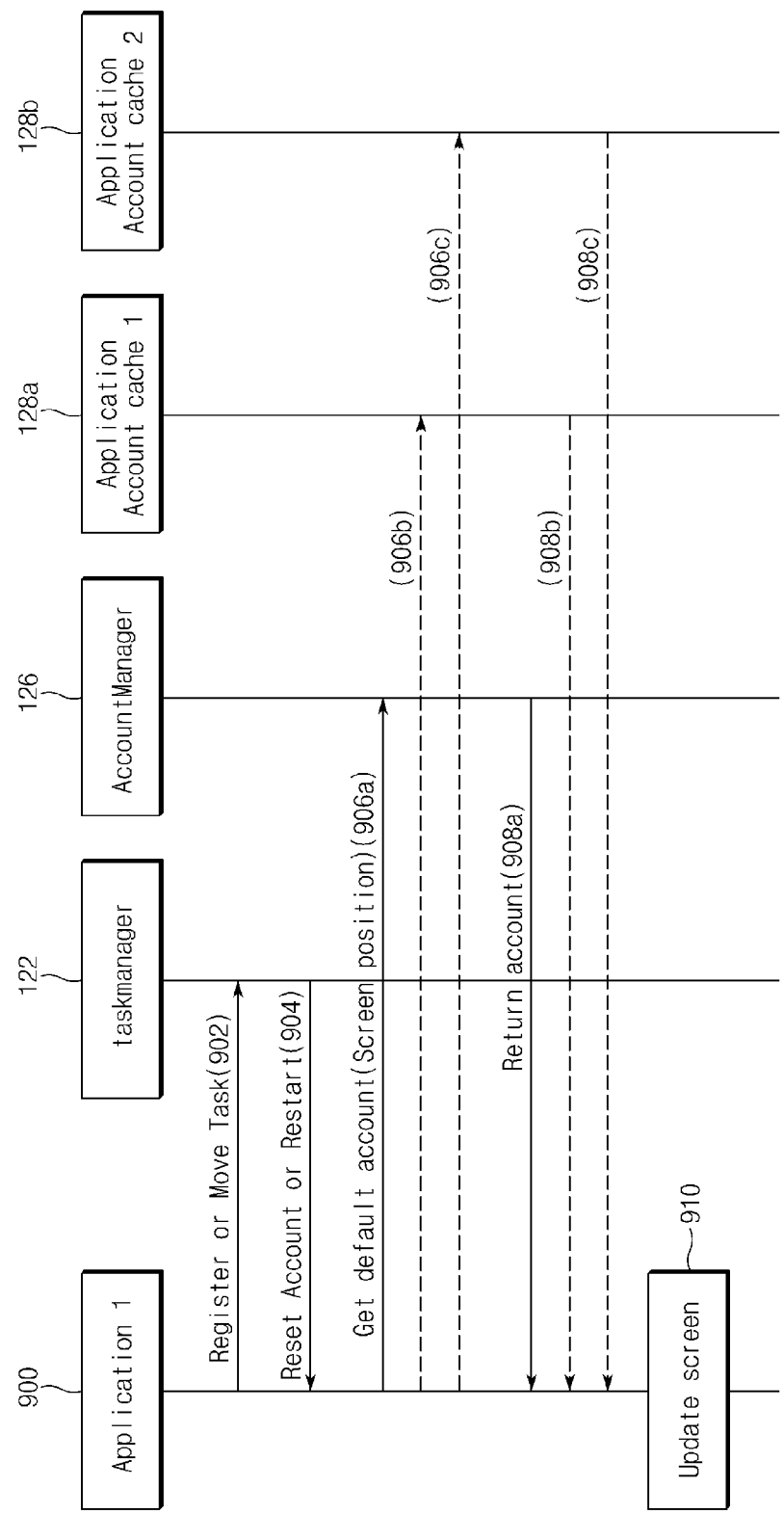
FIG. 9 is a diagram illustrating a method in which an electronic device sets a user account corresponding to an application based on a display where the application is being executed, according to an embodiment of the present disclosure.

FIG. 9 is a diagram illustrating a method in which an electronic device sets a user account corresponding to an application based on a display where the application is being executed, according to an embodiment of the present disclosure. With respect to the user account setting method of FIG. 9, operations are included that the electronic device 100, according to FIGS. 1 to 8, processes time-sequentially. The electronic device 100, with reference to FIGS. 1 to 8, may be applied to the user account setting method illustrated in FIG. 9.

In step 902, an application 900 sends a request to the task manager 122 to register a task according to an execution of the application 900. Further, in step 902, the application 900 notifies the task manager 122 that a display move (or change) request is received through a user input.

In step 904, based on the task registration request received in step 902, the task manager 122 registers a task about the application 900 and also sets a user account for the application 900. If a notification about a display move request is received in step 902, the task manager 122 resets a user account corresponding to a display where the application 900 is executed before moving the application 900, and newly sets a user account corresponding to a display where the application 900 is executed after it is moved.

In step 906a, the application 900 sends a request to retrieve a default account containing account information to the account manager 126, and simultaneously (or subsequently) notifies the account manager 126 that a display where the application 900 is being executed is the first display 112 or the second display 114. In this case, the application 900 requests account information from a first account cache 128a or a second account cache 128b corresponding to a display where the application 900 is being executed, in step 906b or step 906c.

In step 908a, the account manager 126 transmits the account information requested in step 906a to the application 900. Alternatively, in step 908b or step 908c, the requested account information is transmitted from a corresponding account cache 128a or 128b to the application 900.

In operation 910, the application 900 updates an application execution screen to be displayed on a display, based on account information received in at least one of step 908a to step 908c.

Figure 10:
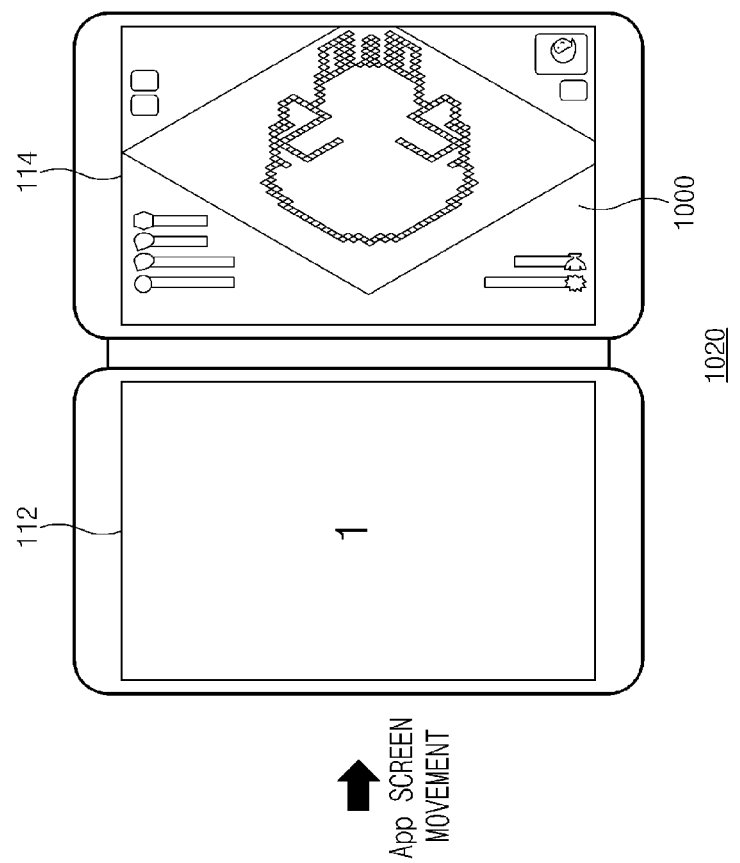
FIG. 10 is a diagram illustrating an operation in which a display on which a game application is executed is changed through a user input and a resource being used is changed, according to an embodiment of the present disclosure.
Figure 10:
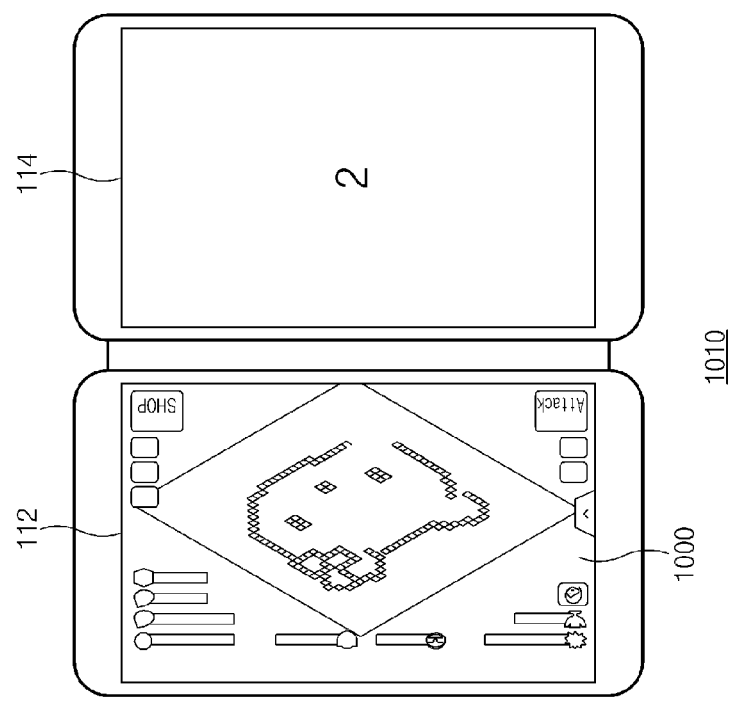

FIG. 10 is a diagram illustrating an operation in which a resource being used is changed as a display on which a game application is executed is changed through a user input received from a user, according to an embodiment of the present disclosure.

In FIG. 10, an execution screen of a game application 1000 displayed on the second display 112 in first operational state 1010 is moved to the second display 114 in second operational state 1020 through user input. The user input may refer to an operation (e.g., a swipe operation) of flicking a user input tool, such as a finger or a stylus, on the first display 112 in a direction of the second display 114.

An execution screen of the game application 1000 executed on the first display 112 is different from an execution screen of the game application 1000 executed on the second display 114. The execution screen of the game application 1000 executed on the first display 112 corresponds to a first user account, and the execution screen of the game application 1000 executed on the second display 114 corresponds to a second user account.

That is, a software resource being used may be changed as a display where the game application 1000 is executed is changed. Accordingly, the user may enjoy a game by changing only a display where the game application 1000 is executed. For example, if a user utilizes a plurality of accounts to control a plurality of characters, a conventional user may be forced to repeat login and logout operations whenever an account is changed. In contrast, according to embodiments of the present disclosure, a user may use different accounts by changing only a display where the game application 1000 is executed.

Figure 11:
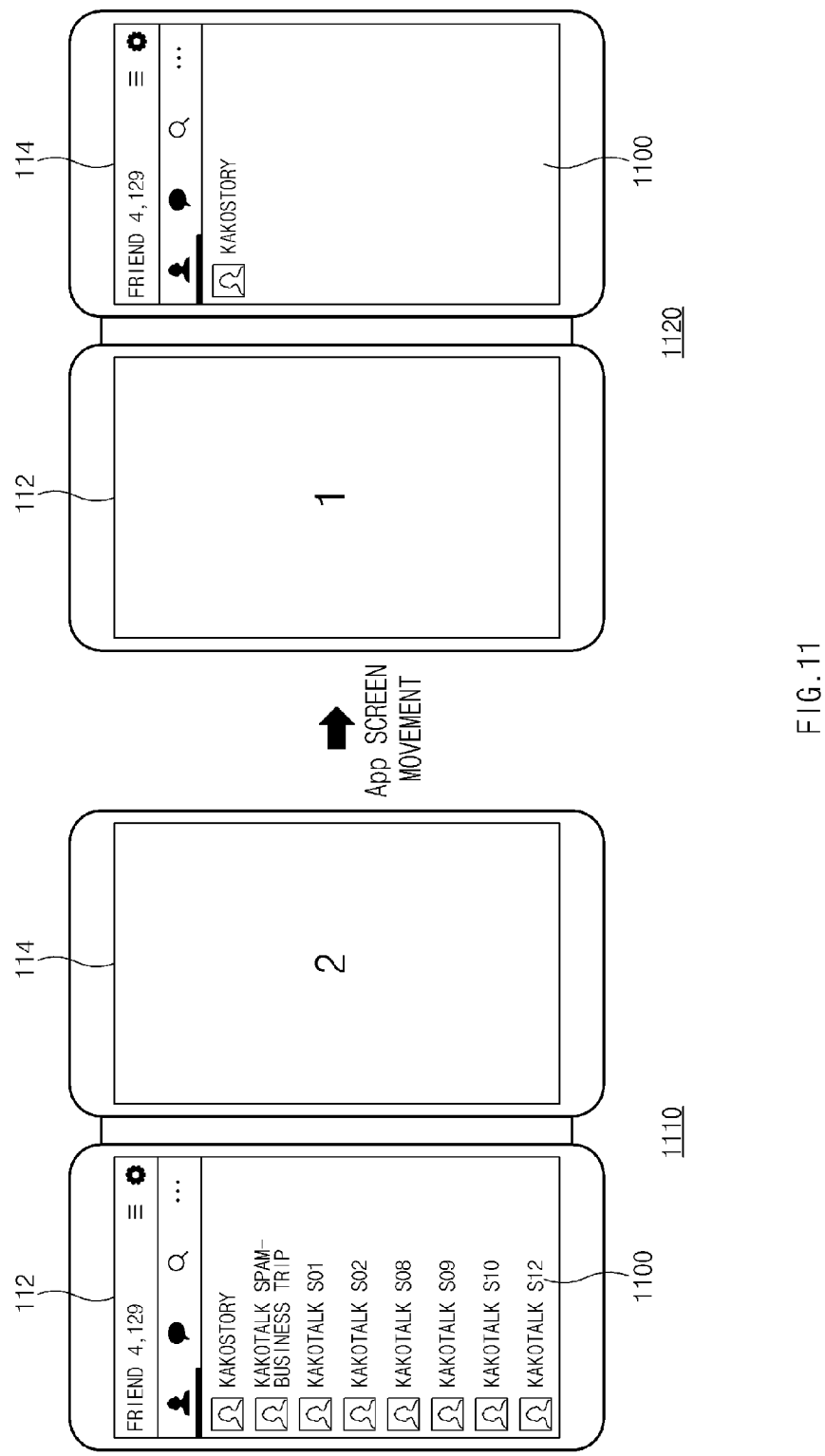
FIG. 11 is a diagram illustrating an operation in which a display on which an instant message application is executed is changed through a user input and a resource being used is changed, according to an embodiment of the present disclosure.

FIG. 11 is a diagram illustrating an operation in which a display on which an instant message application 1100 is executed is changed through a user input received from a user and a resource being used is thus changed, according to an embodiment of the present disclosure.

In FIG. 11, an execution screen of an instant message application 1100 is displayed on the first display 112 in first operational state 1110, and is moved to and displayed on the second display 114 in second operational state 1120, through a user input. The user input may refer to an operation (e.g., a swipe operation) of flicking a user input tool, such as a finger or a stylus, on the first display 112 in a direction of the second display 114.

An execution screen of the instant message application 1100 executed on the first display 112 is different from an execution screen of the instant message application 1100 executed on the second display 114. The execution screen of the instant message application 1100 executed on the first display 112 corresponds to a first user account, and the execution screen of the instant message application 1100 executed on the second display 114 corresponds to a second user account. For example, each of screens displayed in the first operational state 1110 and the second operational state 1120 refer to a friend list of the instant message application 1100. The friend list may correspond to a phone address book history stored in the electronic device 100. The instant message application 1100 executed on the first display 112 may use a phone address book corresponding to the first display 112, and the instant message application 1100 executed on the second display 114 may use a phone address book corresponding to the second display 114. That is, a software resource being used may be changed when a display where the instant message application 1100 is executed is changed.

According to embodiments of the present disclosure, a phone address book corresponding to the first display 112 and a phone address book corresponding to the second display 114 may not exist separately. In this case, the electronic device 100 may use one phone address book and may make security levels different such that the instant message application 1100 displays different friend lists for each display.

Figure 12:
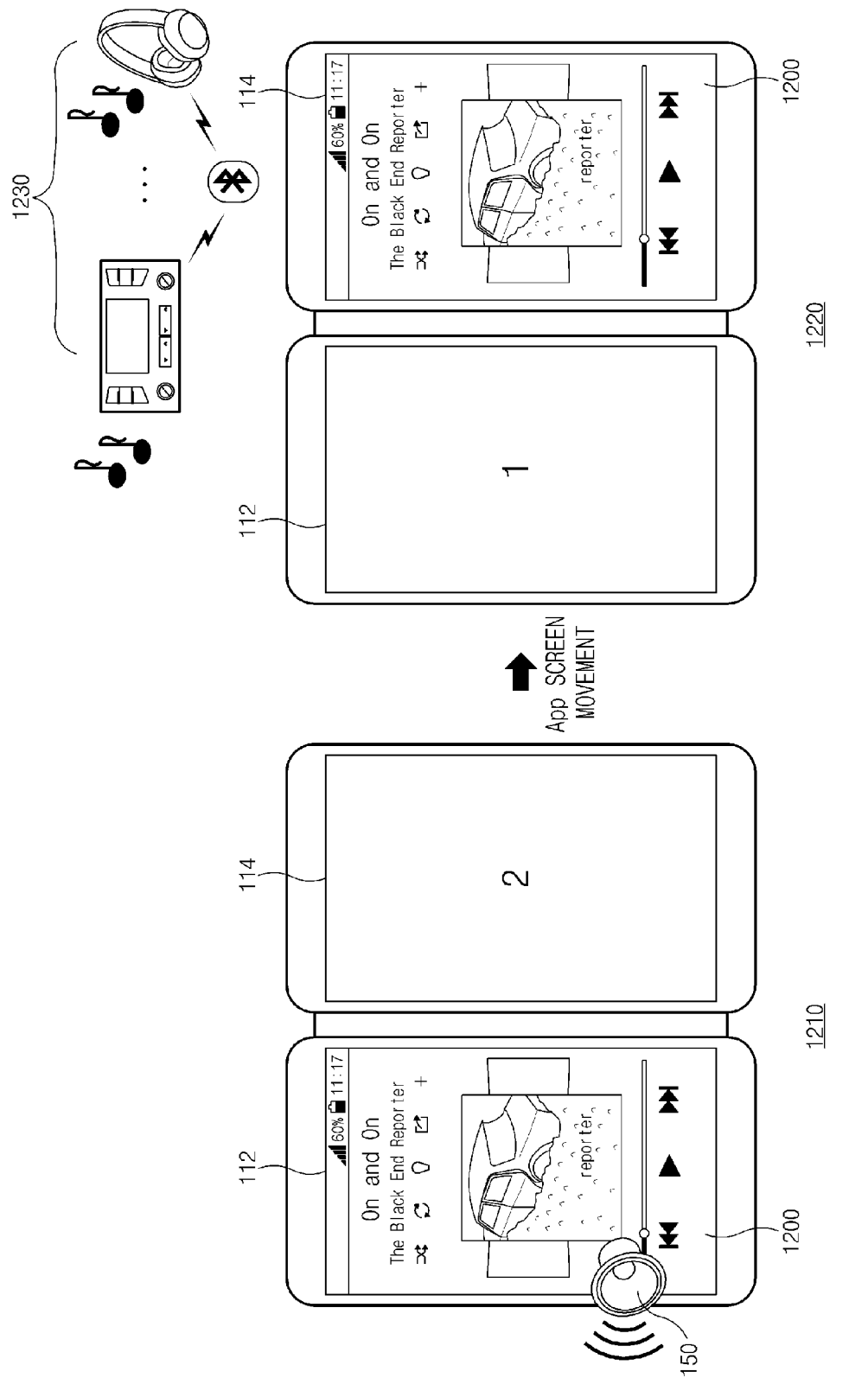
FIG. 12 is a diagram illustrating an operation in which a display on which a music player application is executed is changed through a user input and a resource being used is changed, according to an embodiment of the present disclosure.

FIG. 12 is a diagram illustrating an operation in which a display on which a music player application is executed is changed through a user input and a resource being used is changed, according to an embodiment of the present disclosure.

In FIG. 12, an execution screen of a music player application 1200 is displayed on the second display 112 in first operational state 1210, and is moved to the second display 114 in second operational state 1220, through a user input. When the music player application 1200 is executed on the first display 112, the music player application 1200 reproduces music through a speaker 150, which is a hardware resource corresponding to the first display 112. When the music player application 1200 is executed on the second display 114, the music player application 1200 reproduces music through an external device 1230, which is a hardware resource corresponding to the second display 114 and is connected using a communication module (e.g., Bluetooth (BT)).

Consequently, the user may change a music reproduction method (e.g., a music output device) by changing a display where the music player application 1200 is executed, through a user input.

According to embodiments of the present disclosure, the user may reproduce music with different music reproduction lists through different user accounts by changing a display where the music player application 1200 is executed, through a user input.

Figure 13:
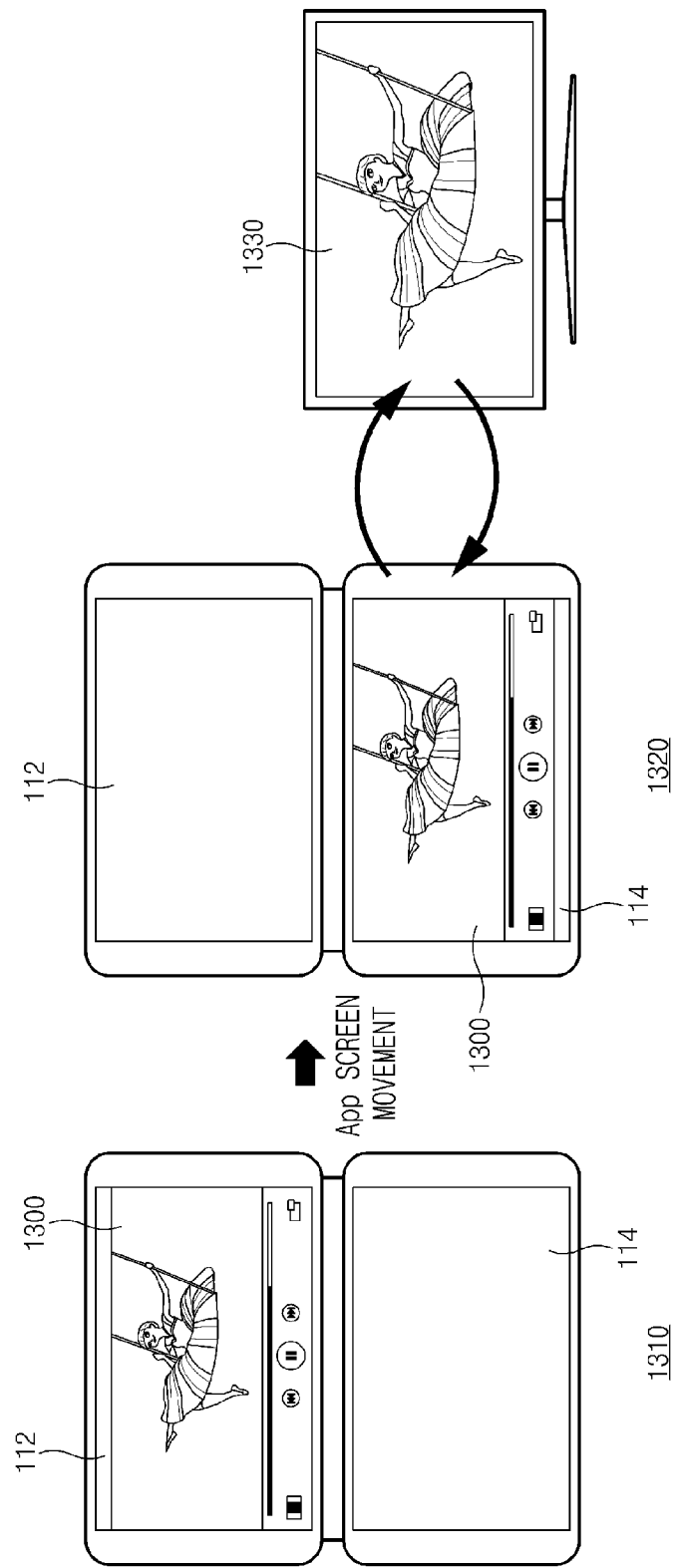
FIG. 13 is a diagram illustrating an operation in which a display on which a video player application is executed is changed through a user input and a resource being used is changed, according to an embodiment of the present disclosure.

FIG. 13 is a diagram illustrating an operation in which a display on which a video player application is executed is changed through a user input and a resource being used is changed, according to an embodiment of the present disclosure.

In FIG. 13, an execution screen of a video player application 1300 is displayed on the second display 112 in a first operational state 1310, and is moved to the second display 114 in a second operational state 1320, through user input. When the video player application 1300 is executed on the first display 112, the video player application 1300 reproduces the video through the first display 112 which is a hardware resource corresponding to the first display 112. When the video player application 1300 is executed on the second display 114, the video player application 1300 reproduces the video through an external device 1330, which is a hardware resource corresponding to the second display 114 and is connected using a communication module (e.g., Bluetooth (BT)). For example, the electronic device 100 may mirror a video reproduced on the second display 114 to the external device 1330 using the communication module.

Consequently, the user may change a video reproduction device by changing a display where the video player application 1300 is executed, through a user input.

Figure 14A:
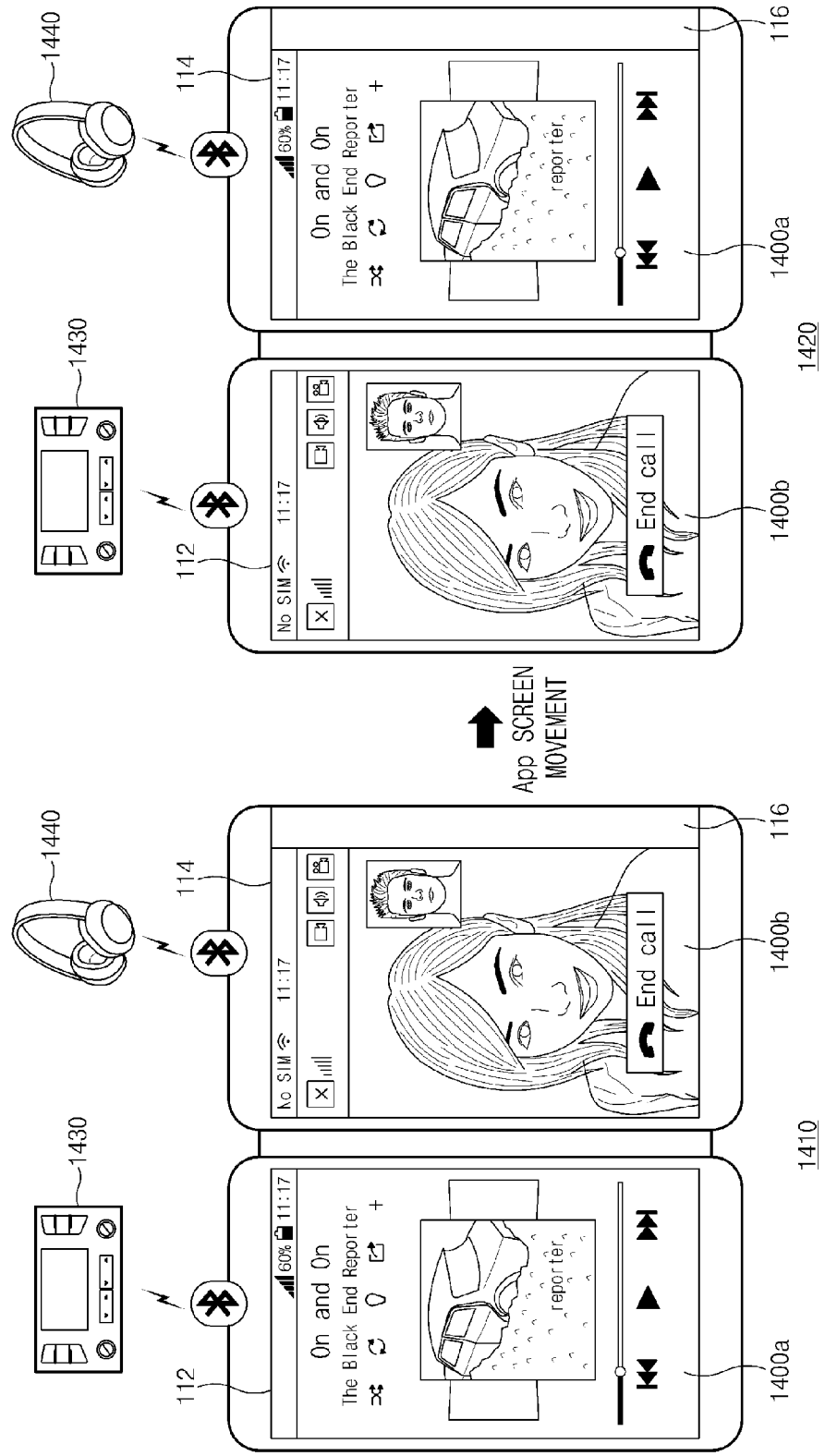
FIG. 14A is a diagram illustrating an operation in which applications respectively executed on displays are exchanged through a user input and resources of the applications use are thus changed, according to an embodiment of the present disclosure.

FIG. 14A is a diagram illustrating an operation in which applications respectively executed on displays are exchanged through a user input received from a user and resources of the applications use are changed, according to an embodiment of the present disclosure.

Referring to FIG. 14A, in a first operational state 1410, a music player application 1400a is executed on the first display 112, and music reproduced by the music player application 1400a is reproduced by car audio equipment 1430 through a communication module. Furthermore, a video call application 1400b is executed on the second display 114, and a call sound is outputted from wireless headphones 1440 through the communication module.

The first operational state 1410 transitions to the second operational state 1420 through a specific type of user input provided from a user. That is, a position of an application executed on the first display 112 and a position of an application executed on the second display 114 are exchanged through the specific type of user input.

In the second operational state 1420, the video call application 1400b is executed on the first display 112, and a call sound is reproduced by the car audio equipment 1430 through the communication module. Furthermore, a music player application 1400a is executed on the second display 114, and music is reproduced by the wireless headphones 1440 through the communication module.

Figure 14B:
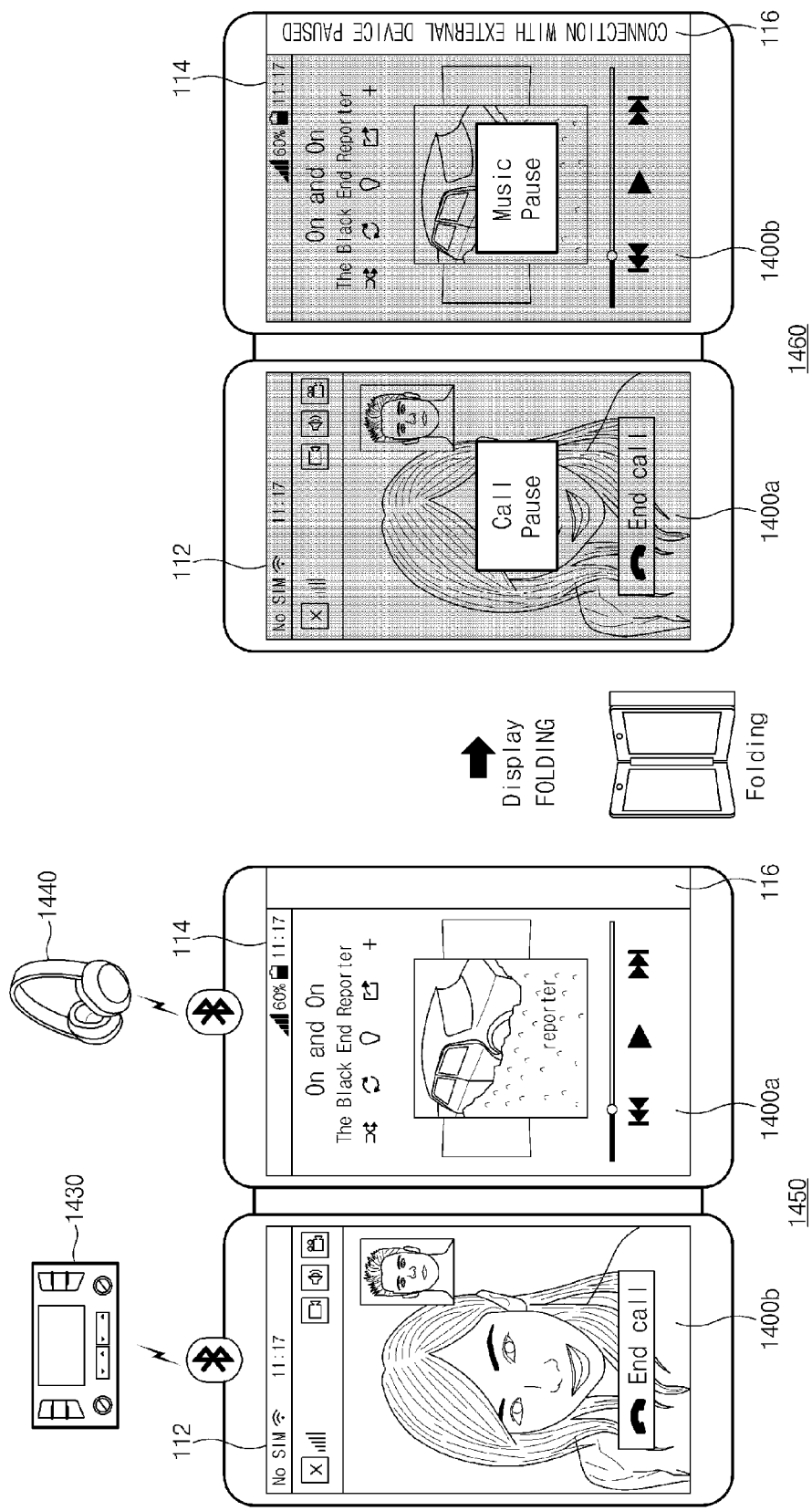
FIG. 14B is a diagram illustrating an operation in which applications respectively executed on displays are paused through an operation of folding the electronic device, according to an embodiment of the present disclosure.

FIG. 14B is a diagram illustrating an operation in which applications respectively executed on displays are paused by folding the electronic device, according to an embodiment of the present disclosure.

First operational state 1450 of FIG. 14B corresponds to second operational state 1420 of FIG. 14A. According to embodiments of the present disclosure, when a user folds the electronic device 100, the first operational state 1450 transitions to the second operational state 1460.

The call application 1400b executed on the first display 112 is set to a call waiting state in the second operational state 1460. Likewise, the music player application 1400a executed on the second display 114 is set to a pause state in the second operational state 1460. A notification indicating the call waiting state and the pause state is displayed on the third display 116. Alternatively, an indication that a connection with the external devices 1430 and 1440 is paused may be displayed on the third display 116.

Even though the electronic device 100 is shown as unfolded in the second operational state 1460, the electronic device 100 may actually be folded and may be illustrated as being unfolded to illustrate the state of the screens. When the electronic device 100 is folded, the third display 116 may remain visible.

Figure 15A:
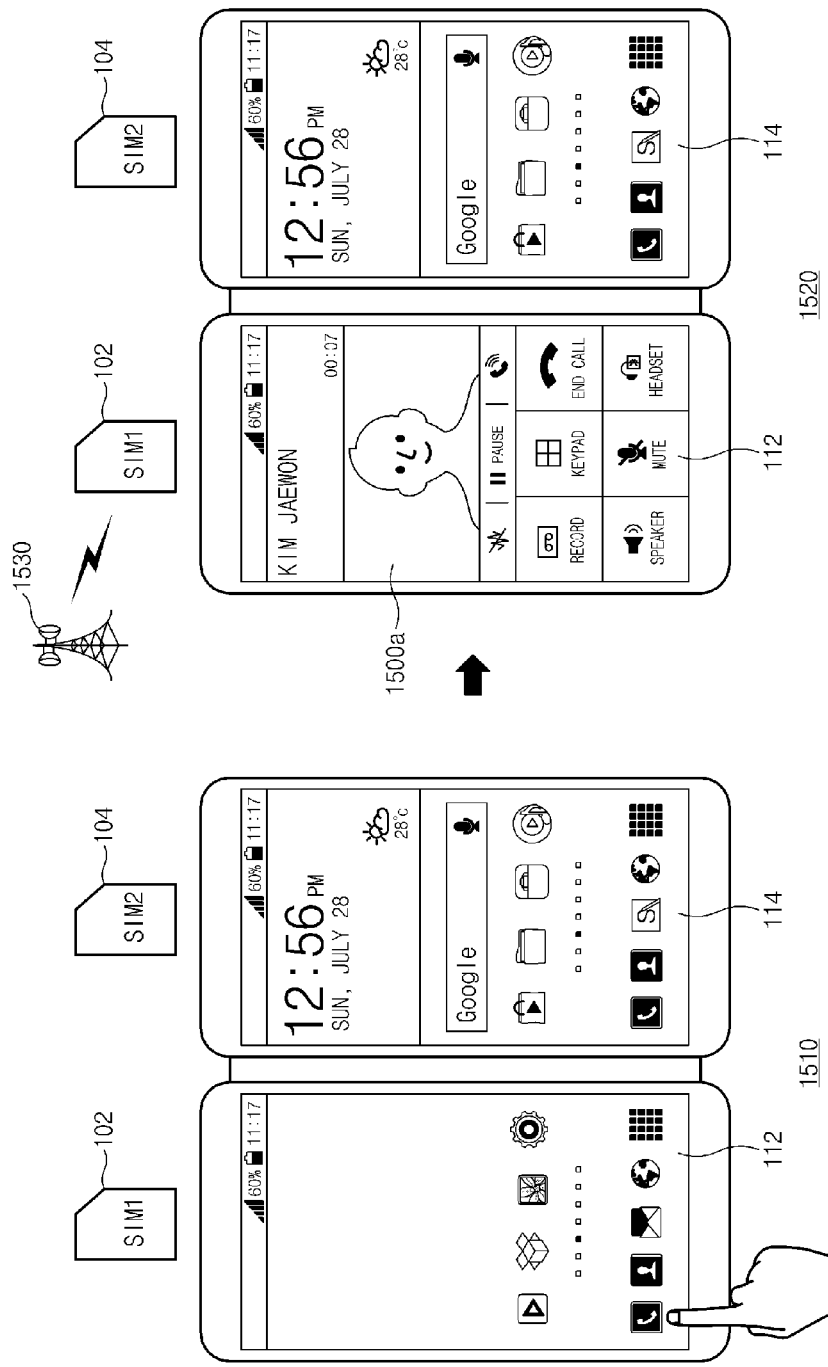
FIGS. 15A and 15B are diagrams illustrating an operation in which an application is executed when resources being used and corresponding displays are different from each other, according to an embodiment of the present disclosure.
Figure 15B:
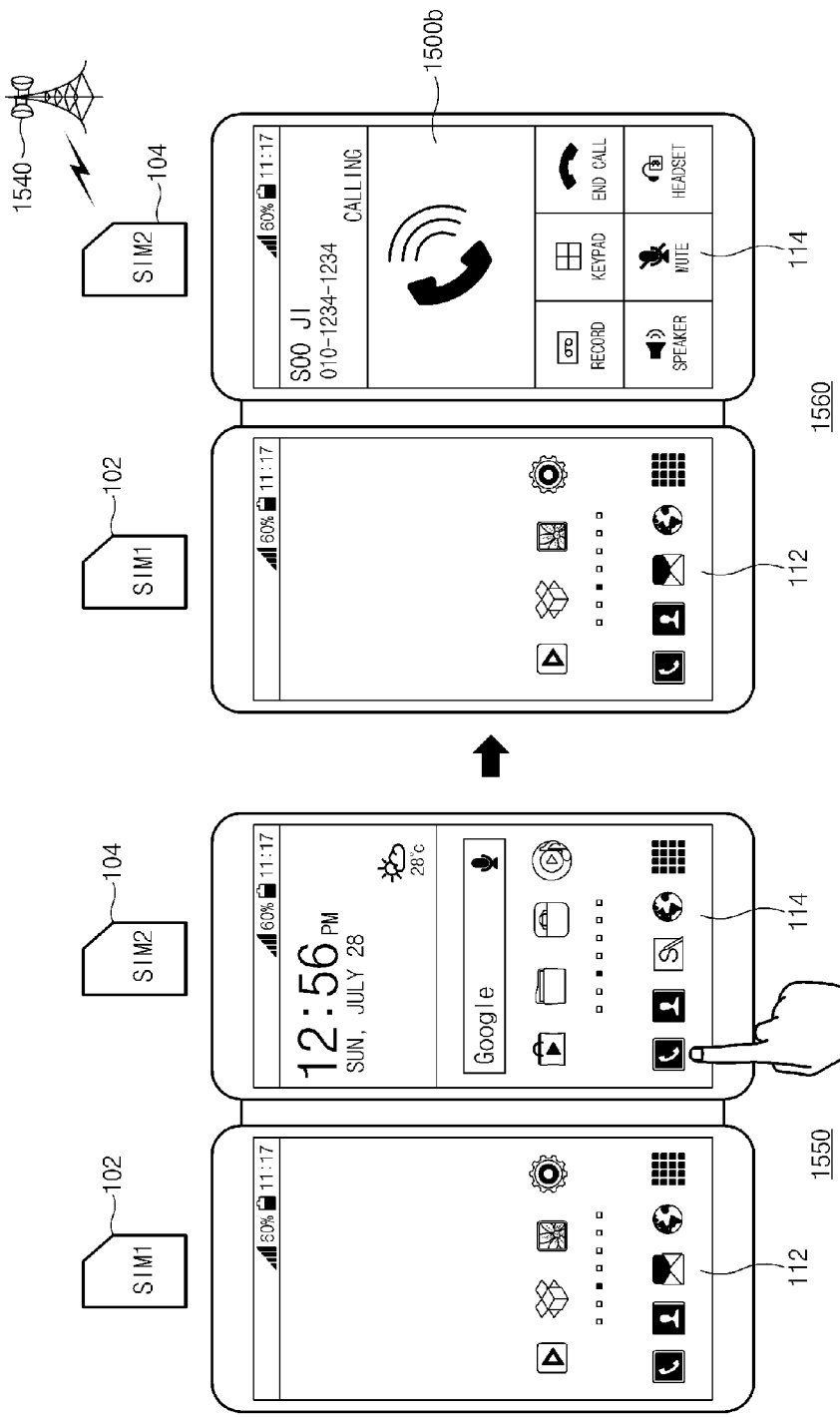

FIGS. 15A and 15B are diagrams illustrating an operation in which an application is executed when resources being used and corresponding to displays are different from each other, according to an embodiment of the present disclosure.

Referring to FIG. 15A, the first display 112 may be in conjunction with a first SIM 102, and the second display 114 may be in conjunction with a second SIM 104. The first and second SIMs 102 and 104 may correspond to different operators.

Referring to FIG. 15A, when a user selects a call application icon displayed on the first display 112 in a first operational state 1510, the electronic device 100 executes a call application 1500a through a first operator 1530 in a second operational state 1520.

Referring to FIG. 15B, when a user selects a call application icon displayed on the second display 114 in a first operational state 1550, the electronic device 100 executes a call application 1500b through a second operator 1540 in a second operational state 1560.

According to embodiments of the present disclosure, the user may make a call with a call forwarding number through the first display 112 and may make a call with an original number through the second display 114.

Alternatively, a call using the first display 112 may be a data call, and a call using the second display 114 may be a voice call.

The term "module", as used herein, may represent, for example, a unit including one or more combinations of hardware, software, and firmware. The term "module" may be interchangeably used with the terms "unit", "logic", "logical block", "component" and "circuit". A module may be a minimum unit of an integrated component or may be a part thereof. A module may be a minimum unit for performing one or more functions or a part thereof. A module may be implemented mechanically or electronically. For example, a module may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to embodiments of the present disclosure may be, for example, implemented by instructions stored in a computer-readable storage media in the form of a program module. The instructions, when executed by one or more processors (e.g., the processor 120), may cause the one or more processors to perform a function corresponding to the instruction. The computer-readable storage media, for example, may be the memory 140.

According to embodiments of the present disclosure, a computer recording medium may be recorded with an instruction, and the instruction, when executed by at least one processor, causes the processor to perform a method including executing an application on the first display or the second display, determining whether the application is executed on the first display or the second display, and utilizing a corresponding hardware resource or software resource at the executed application, based on the determination result.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code, such as things generated by a compiler, but also a high-level language code executable on a computer using an interpreter. The above hardware unit may be configured to operate via one or more software modules for performing an operation of the present disclosure, and vice versa.

A module or a program module according to embodiments of the present disclosure may include at least one of the above-described elements, a portion of the above-described elements may be omitted, or additional elements may be included. Operations performed by a module, a program module, or other elements, according to embodiments of the present disclosure, may be executed sequentially, in parallel, repeatedly, or in a heuristic method. Also, a portion of operations may be executed in different sequences, omitted, or other operations may be added.

According to embodiments of the present disclosure, available hardware resources or software resources may be set differently for each display, and thus, a user may independently use displays of an electronic device for each use.

For example, the user may utilize the displays of the electronic device for the business use and for personal use. Furthermore, the user may utilize the displays of the electronic device for children and for personal use. As a result, it may be possible to improve user convenience.

While the present disclosure has been shown and described with reference to certain embodiments thereof, it will be understood by those skilled in the art that various changes in form and detail may be made therein without departing from the spirit and scope of the present disclosure as defined by the appended claims and their equivalents.

What is claimed is:

1. An electronic device, comprising:
    a first display;
    a second display;
    a memory storing instructions; and
    one or more processors electronically connected to the memory, the one or more processors configured to execute the stored instructions to:
        allocate a first security level to the first display and a second security level to the second display, the first security level being different from the second security level;
        execute an application;
        display a first execution screen of the application based on first data corresponding to the first security level, if the application is executed on the first display; and
        display a second execution screen of the application based on second data corresponding to the second security level, if the application is executed on the second display,
    wherein the first execution screen is different from the second execution screen.

2. The electronic device of claim 1, wherein a first hardware component accessible with respect to the first display is different from a second hardware component accessible with respect to the second display.

3. The electronic device of claim 2, wherein the first hardware component and the second hardware component are selected from a plurality of hardware components comprising a camera, a speaker, a microphone, a receiver, a sensor, and a communication module.

4. The electronic device of claim 3, wherein the one or more processors comprise:
    a resource manager configured to receive an access request for at least one of the plurality of hardware components from the application; and
    a task manager configured to assign an access right for the at least one of the plurality of hardware components to the application.

5. The electronic device of claim 4, wherein:
    the resource manager transfers the access request to the task manager, and
    the task manager determines whether the application is executed on the first display or the second display, and assigns the access right based on a result of determining whether the application is executed on the first display or the second display.

6. The electronic device of claim 4, wherein:
    the task manager is included in the one or more processors as a first task manager corresponding to the first display and a second task manager corresponding to the second display, and
    the resource manager determines whether the application is executed on the first display or the second display, and transfers the received access request to the first task manager or the second task manager based on a result of determining whether the application is executed on the first display or the second display.

7. The electronic device of claim 1, wherein a first user account corresponding to the first display is different from a second user account corresponding to the second display.

8. The electronic device of claim 7, wherein the one or more processors comprise:
    an account manager configured to determine whether the application is executed on the first display or the second display, and to enable one of the first account and the second account based on a result of determining whether the application is executed on the first display or the second display.

9. The electronic device of claim 7, wherein a first subscriber identification module (SIM) card corresponding to the first display is different from a second SIM card corresponding to the second display.

10. A method performed on an electronic device, the method comprising;
    allocating a first security level to the first display; and
    allocating a second security level to the second display, the second security level being different from the first security level;
    executing an application;
    displaying a first execution screen of the application based on first data corresponding to the first security level, if the application is executed on the first display; and displaying a second execution screen of the application based on second data corresponding to the second security level if the application is executed on the second display,
wherein the first execution screen is different from the second execution screen.

11. The method of claim 10, further comprising:
determining whether the application is executed on the first display or the second display; and
utilizing a corresponding hardware resource or software resource at the executed application, based on a result of determining whether the application is executed on the first display or the second display.

12. The method of claim 10, wherein the at least one available hardware component comprises a camera, a speaker, a microphone, a receiver, a sensor, and a communication module.

13. The method of claim 10, further comprising:
setting a first user account with respect to the first display and a second user account with respect to the second display.

14. An electronic device, comprising:
a first display;
a second display;
a memory storing instructions; and
one or more processors electronically connected to the memory, the one or more processors configured to execute the stored instructions to:
allocate a first security level to the first display and a second security level to the second display, the first security level being different from the second security level;
execute an application stored;
display a first execution screen of the application based on first data corresponding to the first security level;
transition the application to execute on the second display;
display a second execution screen of the application based on second data corresponding to the second security level,
wherein the first execution screen is different from the second execution screen.

15. The electronic device of claim 14, wherein each of the first security level and the second security level comprises one or more of at least one available hardware resource and at least one available software resource.

16. The electronic device of claim 14, wherein the one or more processors are further configured to disable a hardware component associated with the first security level and not associated with the second security level, upon transitioning the application to execute on the second display.

17. The electronic device of claim 14, wherein the one or more processors are further configured to change the application such that it is executed by another user, upon transitioning the application to execute on the second display.

18. The electronic device of claim 14, wherein the one or more processors are further configured to change an output device corresponding to the application, upon transitioning the application to execute on the second display.

* * * * *